United States Patent
Thomas

(10) Patent No.: US 10,025,680 B2
(45) Date of Patent: Jul. 17, 2018

(54) HIGH THROUGHPUT, HIGH RELIABILITY DATA PROCESSING SYSTEM

(71) Applicant: Ab Initio Technology LLC, Lexington, MA (US)

(72) Inventor: Ben Thomas, Bedford, MA (US)

(73) Assignee: Ab Initio Technology LLC, Lexington, MA (US)

( * ) Notice: Subject to any disclaimer, the term of this patent is extended or adjusted under 35 U.S.C. 154(b) by 344 days.

(21) Appl. No.: 15/019,003

(22) Filed: Feb. 9, 2016

(65) Prior Publication Data

US 2017/0180473 A1     Jun. 22, 2017

Related U.S. Application Data

(60) Provisional application No. 62/268,090, filed on Dec. 16, 2015.

(51) Int. Cl.
    *G06F 11/20*        (2006.01)
    *G06F 3/06*        (2006.01)
    (Continued)

(52) U.S. Cl.
    CPC ......... *G06F 11/2056* (2013.01); *G06F 3/065* (2013.01); *G06F 11/2079* (2013.01);
    (Continued)

(58) Field of Classification Search
    CPC ............. G06F 11/2056; G06F 11/2079; G06F 11/2082; G06F 12/023; G06F 12/0253; H04L 67/1095; H04L 67/1097
See application file for complete search history.

(56) References Cited

U.S. PATENT DOCUMENTS 6,343,299 B1    1/2002    Huang et al.
6,823,355 B1    11/2004    Novaes et al.
(Continued)

FOREIGN PATENT DOCUMENTS

WO    WO 2012/162176 A2    11/2012

OTHER PUBLICATIONS

Wiesmann et al., "Database Replication Techniques: a Three Parameter Classification," Proceeds of 19th IEEE Symposium on Reliable Distributed Systems, pp. 206-215, Nurnberg, Germany, Oct. 2000; IEEE Computer Society.
(Continued)

*Primary Examiner* — Ramy M Osman
(74) *Attorney, Agent, or Firm* — Wolf, Greenfield & Sacks, P.C.

(57) ABSTRACT

A data processing system configured to store a plurality of data entities in volatile memories of multiple different computing devices. The data processing system comprises a first computing device having a first volatile memory configured to store a first data entity; and a second computing device having a second volatile memory configured to store a copy of the first data entity. The first computing device is configured to perform: receiving an indication to update the first data entity; after receiving the indication, updating the first data entity in the first volatile memory, and providing to the second computing device an indication to update the copy of the first data entity; and providing an indication that the first data entity has been updated, after receiving information from the second computing device indicating that the copy of the first data entity has been updated in the second volatile memory.

29 Claims, 16 Drawing Sheets

(51) Int. Cl.
*H04L 29/08* (2006.01)
*G06F 12/02* (2006.01)
(52) U.S. Cl.
CPC ........ *G06F 11/2082* (2013.01); *G06F 12/023* (2013.01); *H04L 67/1095* (2013.01); *H04L 67/1097* (2013.01); *G06F 12/0253* (2013.01); *G06F 2201/855* (2013.01)

(56) References Cited

U.S. PATENT DOCUMENTS

| | | | |
|---|---|---|---|
| 6,934,755 B1* | 8/2005 | Saulpaugh | G06F 9/4862 709/225 |
| 6,941,410 B1* | 9/2005 | Traversat | G06F 9/4493 711/6 |
| 7,680,839 B1 | 3/2010 | Krishnamurthy et al. | |
| 7,707,165 B1 | 4/2010 | Jiang et al. | |
| 8,997,048 B1* | 3/2015 | Pomerantz | G06F 11/3636 717/124 |
| 9,021,050 B2* | 4/2015 | Shaver | H04L 67/02 707/741 |
| 2003/0018732 A1 | 1/2003 | Jacobs et al. | |
| 2003/0023618 A1 | 1/2003 | Orbits et al. | |
| 2003/0093431 A1 | 5/2003 | Cooke et al. | |
| 2003/0126494 A1* | 7/2003 | Strasser | G06F 11/2038 714/6.2 |
| 2005/0246511 A1* | 11/2005 | Willman | G06F 12/023 711/163 |
| 2007/0067359 A1 | 3/2007 | Barrs et al. | |
| 2007/0180075 A1 | 8/2007 | Chasman et al. | |
| 2010/0223232 A1 | 9/2010 | Wakefield | |
| 2010/0332776 A1* | 12/2010 | Uchikado | G06F 11/2074 711/162 |
| 2011/0055156 A1 | 3/2011 | Roberts et al. | |
| 2011/0099420 A1 | 4/2011 | McAlister et al. | |
| 2012/0222005 A1* | 8/2012 | Harris | G06F 12/023 717/120 |
| 2013/0138607 A1 | 5/2013 | Bashyam et al. | |
| 2013/0204841 A1 | 8/2013 | Obusek | |
| 2013/0339297 A1 | 12/2013 | Chen | |
| 2014/0237172 A1* | 8/2014 | Shah | G06F 12/0246 711/103 |
| 2014/0281138 A1 | 9/2014 | Karamcheti et al. | |
| 2014/0281315 A1* | 9/2014 | Danilak | G06F 11/108 711/162 |
| 2016/0034358 A1* | 2/2016 | Hayasaka | G06F 3/065 711/113 |
| 2016/0041917 A1* | 2/2016 | Trojanowski | G06F 11/1441 711/120 |
| 2017/0180473 A1* | 6/2017 | Thomas | G06F 11/2056 |

OTHER PUBLICATIONS

Kemme et al., "Online Reconfiguration in Replicated Databases Based on Group Communication," The International Conference on Dependable Systems and Networks, Jul. 1-4, 2001, Goteborg, Sweden.
Castro-Company et al, "FOBr: A Version-Based Recovery Protocol for Replicated Databases," Proceedings of the 13th Euromicro Conference on Parallel, Distributed and Network-Based Processing (Euromicro-PDP '05).
Garcia-Munoz et al., "Recovery Protocols for Replicated Databases—a Survey," 21st International Conference on Advanced Information Networking and Applications Workshops (AINAW '07) 2007 IEEE.
International Search Report and Written Opinion for International Application No. PCT/US2016/017108 dated Sep. 6, 2016.

* cited by examiner

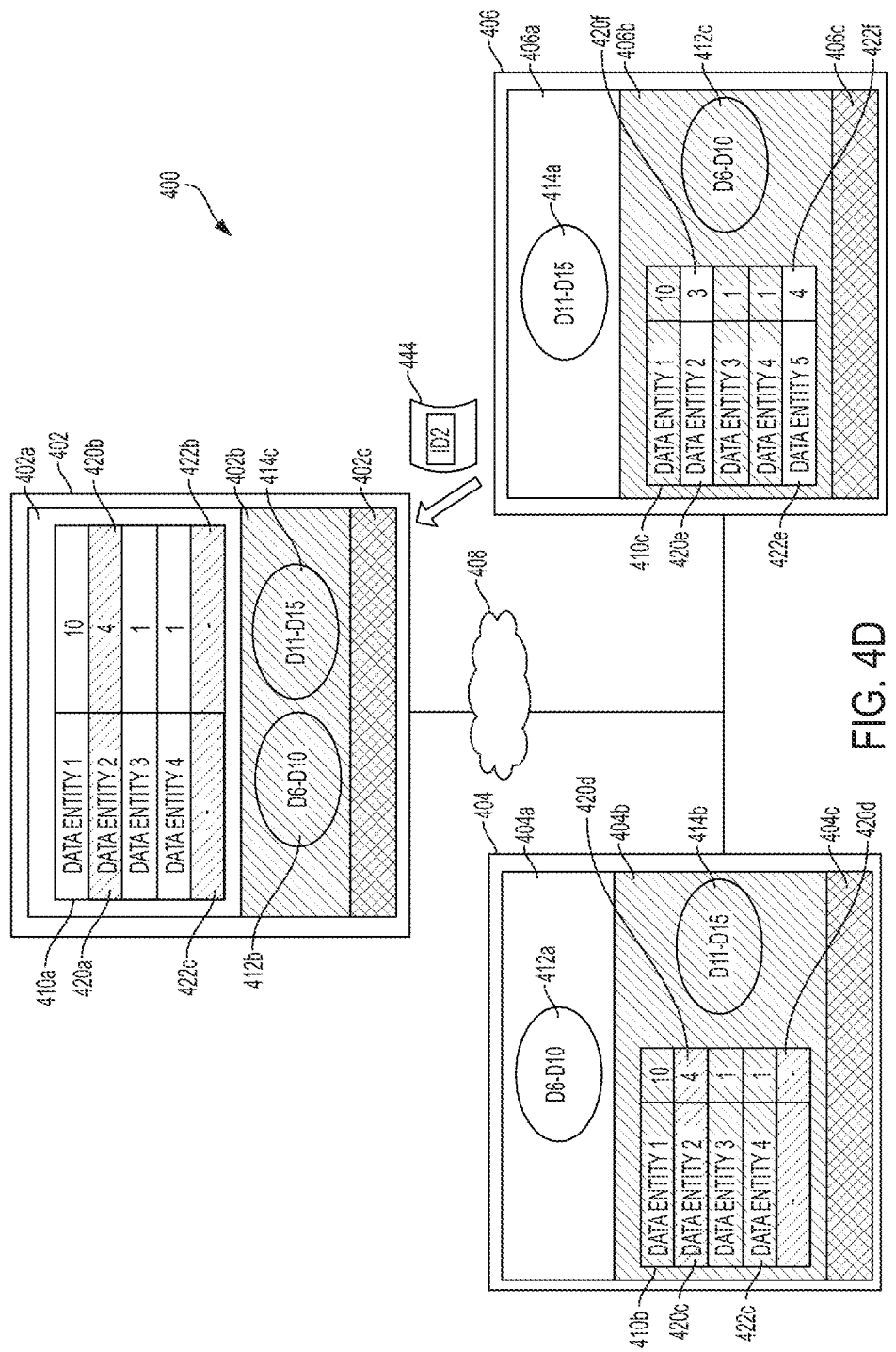

HIGH THROUGHPUT, HIGH RELIABILITY DATA PROCESSING SYSTEM

CROSS-REFERENCE TO RELATED APPLICATION

This application claims the benefit under 35 U.S.C. 119(e) of U.S. Provisional Patent Application Ser. No. 62/268,090, entitled "HIGH THROUGHPUT HIGH RELIABILITY DATA PROCESSING SYSTEM," filed on Dec. 16, 2015, which is incorporated by reference in its entirety.

BACKGROUND

A data processing system may store data using multiple devices. Copies of data stored on one device in the data processing system may be stored on one or more other devices of the data processing system such that if one device becomes unavailable, for example due to a power outage or network problem, the data may still be accessed via at least one other device. Accordingly, a data processing system may replicate data entities across multiple devices and keep the replicated data entities synchronized such that backup copies of data entities stored on any one device are available on other devices. Such replication guards against inaccessibility or loss of data should any one device in the data processing system become unavailable.

A data processing system may keep multiple copies of data entities synchronized by ensuring that if a data entity stored on one device is updated, then so are any of its copies stored on other devices. Some data processing systems synchronize data using so-called "lazy propagation" techniques, whereby changes to a data entity and its copies are made so that copies of the data entity are updated after the data entity is itself updated. One example of a lazy propagation technique is a so-called "journaling" technique in which changes to a data entity are recorded in a log and information in the log is used to update copies of the data entity when access to a copy of the data entity is needed. For example, multiple changes to a particular data entity stored on server A may be recorded to a log without updating a copy of the data entity stored on server B. At a later time, when server A becomes inaccessible, the copy of the data entity on server B may be updated based on information in the log such that an up-to-date version of the data entity may be accessed via server B.

Lazy propagation techniques allow for fast updating of data entities because updating does not require waiting for all copies of the data entity to be updated. On the other hand, lazy propagation techniques result in slow failover because when a server storing a set of data entities becomes inaccessible, copies of these data entities must first be updated (e.g., based on information in a log) before access to them may be provided via another server or servers.

Some data processing systems synchronize data using so-called "eager replication" techniques. Unlike lazy propagation where changes to copies of a data entity are made only after the data entity is updated, eager replication involves updating copies of a data entity before updating the data entity itself. For example, prior to making a change to a data entity stored on server A (e.g., a server designated as a "primary" server for the data entity such that all requests to access and/or update the data entity are provided to the primary server), copies of the data entity are updated first and, subsequently, the change is made to the data entity stored on server A.

Updating data entities using conventional eager replication generally takes more time than when using lazy propagation because eager replication involves updating copies of a data entity before updating the data entity itself. On the other hand, since all copies of the data entities are kept synchronized, eager propagation generally allows for quicker failover than when using lazy propagation.

SUMMARY

Some embodiments provide for a data processing system configured to store a plurality of data entities in volatile memories of multiple computing devices. The data processing system comprises: a first computing device having a first volatile memory configured to store a first data entity, the first data entity associated with a first identifier; and a second computing device, different from and communicatively coupled to the first computing device, having a second volatile memory configured to store a copy of the first data entity associated with a second identifier, wherein the first computing device is configured to perform: receiving an indication to update the first data entity; after receiving the indication, updating the first data entity in the first volatile memory, and providing to the second computing device an indication to update the copy of the first data entity; and providing an indication that the first data entity has been updated, after receiving information from the second computing device indicating that the copy of the first data entity has been updated in the second volatile memory.

Some embodiments provide for a method, performed by a first computing device having a first volatile memory configured to store a first data entity associated with a first identifier, the first computing device being communicatively coupled to a second computing device having a second volatile memory configured to store a copy of the first data entity associated with a second identifier, the second computing device being different from the first computing device. The method comprises: receiving an indication to update the first data entity; after receiving the indication, updating the first data entity in the first volatile memory, and providing to the second computing device an indication to update the copy of the first data entity; and providing an indication that the first data entity has been updated, after receiving information from the second computing device indicating that the copy of the first data entity has been updated in the second volatile memory.

Some embodiments provide for at least one non-transitory computer-readable storage medium storing processor executable instructions that, when executed by a first computing device having a first volatile memory configured to store a first data entity associated with a first identifier, cause the first computing device to perform a method, the first computing device being communicatively coupled to a second computing device having a second volatile memory configured to store a copy of the first data entity associated with a second identifier, the first computing device being different from the second computing device. The method comprises receiving an indication to update the first data entity; after receiving the indication, updating the first data entity in the first volatile memory, and providing to the second computing device an indication to update the copy of the first data entity; and providing an indication that the first data entity has been updated, after receiving information from the second computing device indicating that the copy of the first data entity has been updated in the second volatile memory.

Some embodiments provide for at least one non-transitory computer-readable storage medium storing processor executable instructions for execution by a first computing device having a first volatile memory configured to store a first data entity associated with a first identifier, the first computing device being communicatively coupled to a second computing device having a second volatile memory configured to store a copy of the first data entity associated with a second identifier, the processor executable instructions comprising: means for receiving an indication to update the first data entity; means for updating the first data entity in the first volatile memory, and providing to the second computing device an indication to update the copy of the first data entity, after receiving the indication; and means for providing an indication that the first data entity has been updated, after receiving information from the second computing device indicating that the copy of the first data entity has been updated in the second volatile memory.

Some embodiments provide for a data processing system configured to store data entities in volatile memories of multiple computing devices. The data processing system comprises: a first computing device having a first volatile memory configured to store a plurality of data entities, the plurality of data entities associated with first respective identifiers; and a second computing device, different from and communicatively coupled to the first computing device, having a second volatile memory configured to store copies of data entities in the plurality of data entities, the copies associated with second respective identifiers, wherein the first computing device is configured to perform: receiving an indication to perform resynchronization; providing, to the second computing device, information comprising an identifier and a version number for each of the plurality of data entities; receiving, from the second computing device, information identifying at least one data entity stored in the first volatile memory that is not synchronized with its respective at least one copy in the second volatile memory; and in response to receiving the information, providing to the second computing device the at least one data entity stored in the first volatile memory.

Some embodiments provide for a method, performed by a first computing device having a first volatile memory configured to store a plurality of data entities associated with first respective identifiers, the first computing device being different from and communicatively coupled to a second computing device having a second volatile memory configured to store copies of data entities in the plurality of data entities, the copies associated with second respective identifiers. The method comprises: receiving an indication to perform resynchronization; providing, to the second computing device, information comprising an identifier and a version number for each of the plurality of data entities; receiving, from the second computing device, information identifying at least one data entity stored in the first volatile memory that is not synchronized with its respective at least one copy in the second volatile memory; and in response to receiving the information, providing to the second computing device the at least one data entity stored in the first volatile memory.

Some embodiments provide for at least one non-transitory computer readable storage medium storing processor-executable instructions that, when executed by a first computing device having a first volatile memory configured to store a plurality of data entities associated with first respective identifiers, cause the first computing device to perform a method, the first computing device being different from and communicatively coupled to a second computing device having a second volatile memory configured to store copies of data entities in the plurality of data entities, the copies associated with second respective identifiers. The method comprises: receiving an indication to perform resynchronization; providing, to the second computing device, information comprising an identifier and a version number for each of the plurality of data entities; receiving, from the second computing device, information identifying at least one data entity stored in the first volatile memory that is not synchronized with its respective at least one copy in the second volatile memory; and in response to receiving the information, providing to the second computing device the at least one data entity stored in the first volatile memory.

Some embodiments provide for a data processing system configured to store data entities in volatile memories of multiple different computing devices. The data processing system comprises: a first computing device having an first volatile memory configured to store a plurality of data entities associated with first respective identifiers; and a second computing device, different from and communicatively coupled to the first computing device, having a second volatile memory configured to store copies of data entities in the plurality of data entities stored in the first volatile memory, the copies associated with second respective identifiers; wherein the second computing device is configured to perform: providing, to the first computing device, an indication to perform resynchronization; receiving, from the first computing device, information comprising an identifier and a version number for each of the plurality of data entities; providing, to the first computing device, information identifying at least one data entity stored in the first volatile memory that is not synchronized with its respective at least one copy in the second volatile memory; and receiving, from the first second computing device the at least one data entity stored in the first volatile memory.

Some embodiments provide for a method, performed by a second computing device having a second volatile memory configured to store copies of data entities in a plurality of data entities, the plurality of data entities stored in a first volatile memory of a first computing device different from and communicatively coupled to the second computing device. The method comprises: providing, to the first computing device, an indication to perform resynchronization; receiving, from the first computing device, information comprising an identifier and a version number for each of the plurality of data entities; providing, to the first computing device, information identifying at least one data entity stored in the first volatile memory that is not synchronized with its respective at least one copy in the second volatile memory; and receiving, from the first second computing device the at least one data entity stored in the first volatile memory.

Some embodiments provide for at least one non-transitory computer readable storage medium storing processor-executable instructions that, when executed by a second computing device, cause the second computing device to perform a method, the second computing device having a second volatile memory configured to store copies of data entities in a plurality of data entities stored in a first volatile memory of a first computing device different from and communicatively coupled to the second computing device. The method comprises: providing, to the first computing device, an indication to perform resynchronization; receiving, from the first computing device, information comprising an identifier and a version number for each of the plurality of data entities; providing, to the first computing device, information identifying at least one data entity stored in the first volatile memory that is not synchronized with its respective at least one copy in the second volatile memory; and receiving, from the first second computing device the at least one data entity stored in the first volatile memory.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIGS. 4A, 4B, 4C, 4D, 4E, and 4F show an illustrative example of manifest-based resynchronization, in accordance with some embodiments of the technology described herein.

DETAILED DESCRIPTION

Figure 1A:
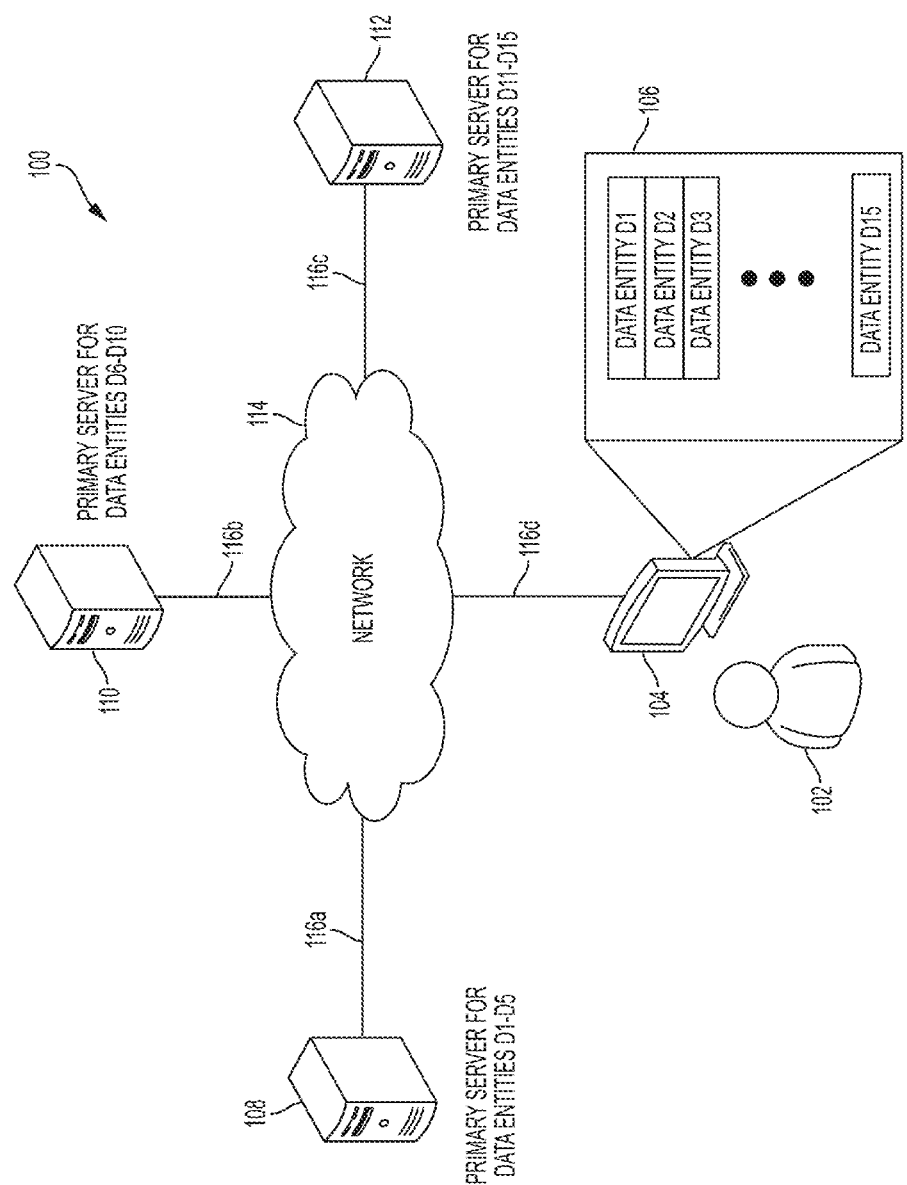
FIG. 1A is a block diagram of an illustrative data processing system, in which some embodiments of the technology described herein may operate.

The inventors have recognized and appreciated that operating characteristics of a data processing system, including speed and network bandwidth usage, may be improved with an improved data replication process. Such a replication process may enable fast data access, fast data updating, and fast data recovery in the data processing system while efficiently using its processing and networking resources. By contrast, conventional data replication techniques do not support fast data access, updating and recovery at the same time. For example, although conventional lazy propagation techniques allow for fast data updating because backup copies of data entities are not updated until after the primary copies of the data entities are updated, data recovery is slow due to the use of journaling. As a result, conventional lazy propagation techniques are not appropriate when fast failover is required, such as in a "high-reliability" setting in which backup copies of data are available and can be accessed quickly. As another example, although conventional eager replication techniques enable fast data recovery, data updating is slow because backup copies of data entities are updated before their respective primary copies, which leads to delays. As a result, conventional eager replication techniques are impractical and are not used in a "high-throughput" setting in which a large number of data entities (e.g., millions or billions of bank transactions) may be updated in a short period of time.

Accordingly, some embodiments provide for an improved data replication process that allows for fast updating, access, and recovery of data, via use of volatile memory to store the data. Despite the greater risks to data integrity arising from use of volatile storage, the replication process developed by the inventors ensures that data is reliably maintained by the data processing system across volatile memories of multiple devices and that the data is synchronized across these devices. The replication process efficiently uses the system's network resources at least in part by using low-bandwidth techniques for resynchronizing any data that has become unsynchronized, for example, because of network or power outages.

Accordingly, some embodiments provide for an in-memory data processing system configured to manage data in the volatile memories of multiple devices of the system. Managing data includes functionality such as, for example, storing data, deleting stored data, receiving new data (e.g., for storage), processing data, providing electronic access to data to already stored data, and/or updating stored data (e.g., by changing one or more values in the data stored). Data managed by the in-memory data processing system may include multiple data entities replicated across multiple volatile memories using a replication technique developed by the inventors. A data entity may include one or more data items, such as records and variables. Volatile memory may be any computer memory, for example random access memory (RAM), that uses power to maintain the information stored therein; the volatile memory retains the data stored therein while powered on, but loses the stored data when powered off. The in-memory data processing system does not require time-consuming reads and writes to non-volatile memory, such as hard disks for example, to update copies of data entities, which reduces the amount of time used for updating copies of data entities and makes eager replication techniques faster to the point that their use becomes practical in a high-reliability and high-throughput setting.

In some embodiments, the data entities managed by the in-memory data processing system are grouped, and each group of data entities is associated with a respective primary device (e.g., a primary server) through which the data entities in the group may be accessed and/or updated. Data entities in a group are also associated with one or more respective backup devices (e.g., one or more backup servers) that store copies of the data entities. A data entity stored in the volatile memory of its primary device is referred to herein as a primary copy of the data entity, and its copies are referred to herein as backup copies.

In some embodiments, a device in the data processing system may store in an on-heap portion of its volatile memory any data entities for which the device serves as a primary device. The device may store in an off-heap portion of its volatile memory any data entities for which it serves as a backup device. Memory in off-heap volatile memory may be managed using contiguous blocks of memory and without use of automatic garbage collection, further increasing the efficiency of managing any data stored therein. Since, in many instances, the in-memory data processing system may be managing more backup than primary copies of data entities, for example, when each data entity is replicated two or more times, the increased efficiency of managing the backup copies using off-heap memory serves to further improve performance of the replication technique developed by the inventors.

In some embodiments, a primary device for a group of data entities may become inaccessible (e.g., due to a power outage or a network outage) and a backup device may begin to operate as a primary device for one or more of the data entities in the group. In such a situation, even though the backup device is now a primary device for one or more of the data entities in the group, the backup device may continue to store these data entities in off-heap memory until access to the data entities is requested, at which point the data entities are moved to on-heap memory of the backup device. In this way, failover may be performed very quickly without requiring that all backup copies of data entities be moved, proactively before access to them is required, from off-heap to on-heap volatile memory of a backup device.

In some instances, copies of data entities managed by a data processing system may become unsynchronized due to events such as network and power outages. For example, network and/or power outages may make inaccessible a device storing data entities, which may be updated on one or more other devices during the period of inaccessibility. Power outages present a unique risk in the context of volatile memory since the loss of power in a device leads to loss of all data stored only in volatile memory of that device. Because a data processing system may manage a large amount of data (e.g., millions or billions of data entities such as bank or credit card transactions), a low-bandwidth technique for resynchronization is required to achieve a high-throughput data processing system that can reliable process a large number of transactions per unit of time (e.g., millions of transactions per second).

Accordingly, the inventors have developed a low-bandwidth resynchronization technique to efficiently resynchronize the data entities stored by the devices in the in-memory data processing system. The low-bandwidth technique is a manifest-based resynchronization technique that synchronizes the data entities managed by the data processing system based, at least in part, on version numbers associated with the data entities.

In some embodiments, each device of the data processing system may maintain a respective local version number for each data entity stored in the volatile memory of the device. In response to an indication to perform resynchronization, a primary device for a group of data entities may provide a manifest containing a version number for each of the data entities in the group to one or more backup devices storing corresponding backup copies of the data entities in the group. Each backup device may compare the version numbers in the manifest to local version numbers of the backup copies of data entities stored in its volatile memory and, based on results of the comparison, identify unsynchronized ("out-of-synch") data entities and request these data entities from the primary device. Accordingly, in response to sending out a manifest, the primary device may receive requests for data entities from one or more backup devices and may provide the requested data entities to the requesting backup devices.

Some embodiments of the technology described herein address some of the above-discussed drawbacks of conventional data replication techniques. However, not every embodiment addresses every one of these drawbacks, and some embodiments may not address any of them. As such, it should be appreciated that aspects of the technology described herein are not limited to addressing all or any of the above-discussed drawbacks of conventional data replication techniques.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1A is a block diagram of an illustrative data processing system 100 configured to manage data entities in volatile memories of multiple computing devices. As shown, illustrative data processing system 100 is configured to manage data entities 106 in volatile memories of computing devices 108, 110, and 112. Data entities 106 include fifteen data entities in this non-limiting example. Although data processing system 100 is shown as managing fifteen data entities in volatile memories of three computing devices, this is merely for clarity of presentation and not by way of limitation. A data processing system may store any suitable number of data entities (e.g., thousands, millions, billions, or trillions of data entities) in the volatile memories of any suitable number of computing devices (e.g., at least 10, at least 100, at least 1000, at least 10,000, between 10 and 10,000, etc.), as aspects of the technology described herein are not limited in this respect.

In some embodiments, a data entity may include one or more data items, such as one or more records and/or one or more variables. Examples of data items include, but are not limited to, credit card transaction records, phone call records, bank transactions records. A data entity may include any suitable amount of data. For example, a data entity may include one or multiple bytes of data, at least a kilobyte of data, at least ten kilobytes of data, at least a megabyte of data, etc.

The data processing system 100 may be configured to allow one or more computer programs to provide new data entities to the system, delete data entities managed by the system, access data entities managed by the system, and/or update information in the data entities managed by the system. Such computer programs may be part of or external to the data processing system 100. One or more users (e.g., user 102) may access one or more of the data entities stored by data processing system 100 via one or more computer programs at least partially executing on a computing device part of (e.g., computing device 104) and/or configured to communicate with the data processing system 100.

In some embodiments, the data entities managed by data processing system 100 may be partitioned into multiple groups of data entities. A group of data entities may be associated with multiple computing devices including: (1) a primary computing device (e.g., a primary server) configured to store primary copies of the data entities in the group; and (2) one or more backup computing devices (e.g., one or more backup servers) each of which is configured to store backup copies of one or more data entities in the group. Data entities in a group may be accessed and/or updated through (and, in some embodiments, only through) the primary computing device associated with the group.

As shown in FIG. 1A, for example, data entities 106 are partitioned into three groups of entities: data entities D1-D5, data entities D6-D10, and data entities D11-D15. Computing device 108 is the primary computing device for the group of data entities D1-D5 and may serve as a backup computing device for one or more other groups of data entities. Thus, computing device 108 stores the primary copies of data entities D1-D5 and may store backup copies of one or more of the data entities D6-D15. Computing device 110 is the primary computing device for the group of data entities D6-D10 and may serve as a backup computing device for one or more other groups of data entities. Thus, computing device 110 stores the primary copies of data entities D6-D10 and may store backup copies of one or more of the data entities D1-D5 and D11-D15. Computing device 112 is the primary computing device for the group of data entities D11-D15 and may serve as a backup computing device for one or more other groups of data entities. Thus, computing device 112 stores the primary copies of data entities D11-D15 and may store backup copies of one or more of the data entities D1-D10.

It should be appreciated that the data entities may be partitioned into multiple groups either explicitly or implicitly. In some embodiments, the data entities may be explicitly partitioned into groups and each of the resulting groups may be associated with a respective primary computing device. For example, data entities 106 may be explicitly partitioned into three groups (e.g., a first group containing entities D1-D5, a second group containing entities D6-D10, and a third group containing D11-D15), and each of these groups may be associated with a respective primary computing device (e.g., computing devices 108, 110, and 112).

In some embodiments, each of the data entities managed by the data processing system may be associated with a primary computing device, which association implies a grouping of data entities—all data entities associated with the same primary computing device may be considered as a group. For example, each of data entities D1-D5 may be assigned to computing device 108 as the primary computing device for these data entities and, due to their common association with the same computing device, may be considered to constitute a group of data entities. A data entity may be associated with a primary computing device in any suitable way and, for example, may be associated with a primary computing device via a deterministic mapping that maps the data entity (e.g., based on data in the data entity, an identifier of the data entity, and/or any other information associated with the data entity) to a particular primary computing device.

It should be appreciated that data entities managed by a data processing system may be partitioned into any suitable number groups in any suitable way. For example, as shown in FIG. 1A, the data entities may be partitioned into groups having the same or similar number of data entities, but this is not a limitation of the technology described herein and, in some embodiments, the data entities may be partitioned into groups having different numbers of data entities. Also, although in the illustrated example of FIG. 1A the data entities are grouped sequentially based on their numerical identifiers, this too is not a limitation of the technology described herein and is done merely for clarity of exposition.

Each of computing devices 104, 108, 110, and 112 may be any suitable type of computing device, fixed or portable, as aspects of the technology described herein are not limited in this respect. In addition, computing devices 104, 108, 110, and 112 need not be the same type of computing device. Computing devices 104, 108, 110, and 112 are configured to communicate with one another via network 114 and connections 116a, 116b, 116c, and 116d. Network 114 may be any suitable type of network such as the Internet, an intranet, a wide area network, a local area network, and/or any other suitable type of network. Each of connections 116a, 116b, 116c, and 116d may be a wired, wireless, and/or any other suitable type of connection.

Computing devices, which are part of data processing system 100, include memory for storing data entities managed by data processing system 100. A computing device in data processing system 100 configured to store data entities includes volatile memory (e.g., random access memory, CPU cache memory, etc.) and, optionally, non-volatile memory (e.g., read only memory (ROM), flash memory, solid-state memory, disk memory, etc.). Volatile memory may include an on-heap portion and an off-heap portion.

Figure 1B:
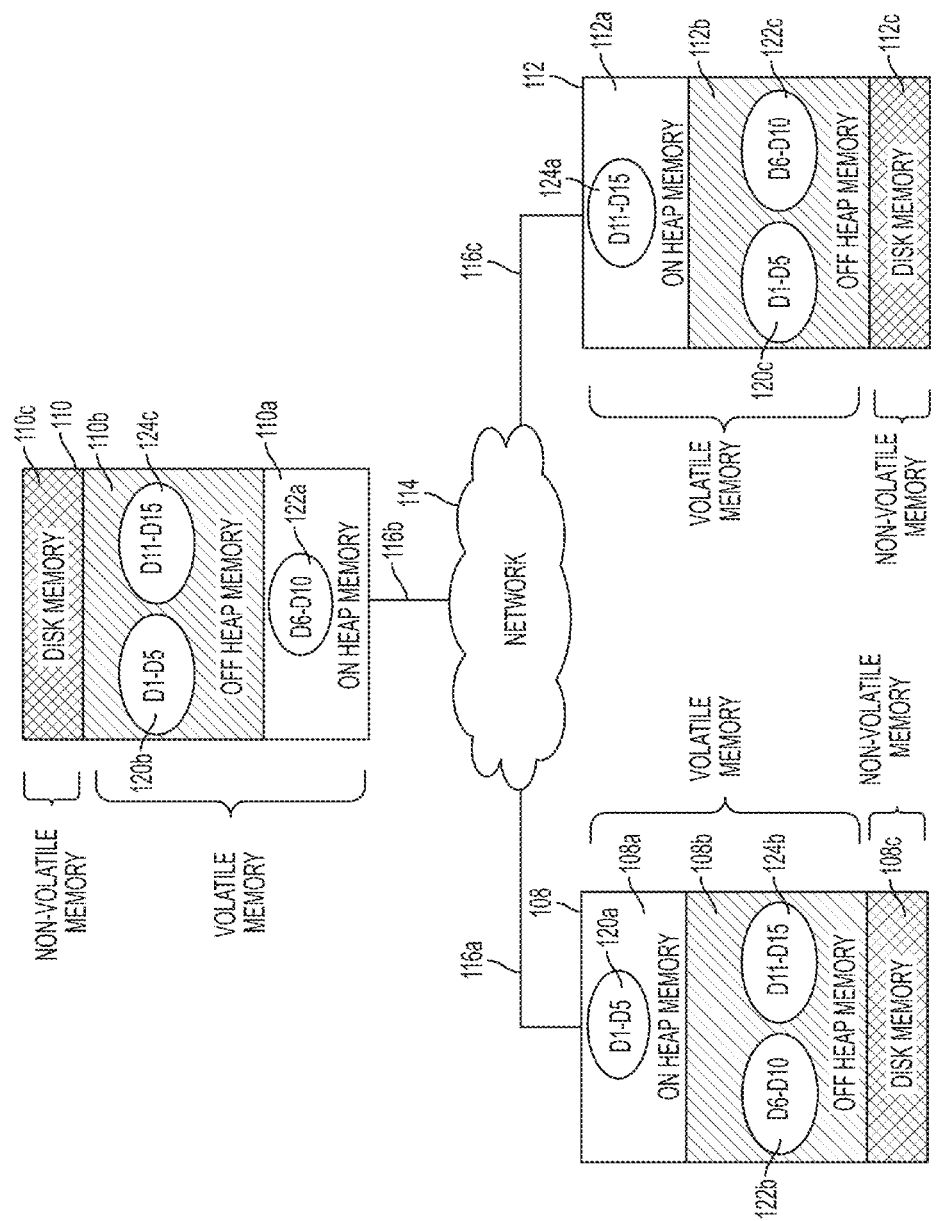
FIG. 1B illustrates one example of how the data processing system of FIG. 1A may manage data entities and their respective copies across multiple devices, in accordance with some embodiments of the technology described herein.

For example, as shown in FIG. 1B, computing device 108 has volatile memory including on-heap memory 108a and off-heap volatile memory 108b, and non-volatile memory including disk memory 108c. Computing device 110 has volatile memory including on-heap memory 110a and off-heap volatile memory 110b, and non-volatile memory including disk memory 110c. Computing device 112 has volatile memory including on-heap memory 112a and off-heap volatile memory 112b, and non-volatile memory including disk memory 112c. Although each of the computing devices part of data processing system 100 includes both volatile and non-volatile memory, one or more computing devices part of data processing system 100 may have volatile memory only, as aspects of the technology described herein are not limited in this respect.

In some embodiments, a device in the data processing system 100 may store data entities for which the device is a primary device in an on-heap portion of its volatile memory. For example, as shown in FIG. 1B, computing device 108 is a primary computing device for data entities D1-D5 and stores data entities 120a, which are primary copies of data entities D1-D5, in on-heap volatile memory 108a. Computing device 110 is a primary computing device for data entities D6-D10 and stores data entities 122a, which are primary copies of data entities D6-D10, in on-heap volatile memory 110a. Computing device 112 is a primary computing device for data entities D11-D15 and stores data entities 124a, which are primary copies of data entities D11-D15, in on-heap volatile memory 112a.

Additionally, in some embodiments, a device in the data processing system 100 may store data entities for which the device is a backup device in an off-heap portion of its volatile memory. For example, as shown in FIG. 1B, computing device 108 is a backup computing device for data items D6-D15 and stores, in off-heap volatile memory 108b, data entities 122b and 124b, which are backup copies of data entities D6-D10 and D11-D15, respectively. Computing device 110 is a backup computing device for data items D1-D5 and D11-D15 and stores, in off-heap volatile memory 110b, data entities 120b and 124c, which are backup copies of data entities D6-D10 and D11-D15, respectively. Computing device 112 is a backup computing device for data items D1-D10 and stores, in off-heap volatile memory 112b, data entities 120c and 122c, which are backup copies of data entities D1-D5 and D6-D10, respectively.

In some embodiments, a device in the data processing system may store data entities and information associated with the stored data entities. For example, a device may store a version number for each one of at least a subset of the data entities stored in volatile memory of the device. Additionally or alternatively, a device may store identifiers for each one of at least a subset of the data entities. As described below, these identifiers and version numbers may be used for resynchronization of data entities across multiple devices of the data processing system. For example, as shown in FIG. 1D, on heap memory 108a stores the contents of the data entities D1-D5, identifiers for each of these data entities D1-D5, and version numbers for each of these data entities. Although, this information is shown as being part of a table, this is for illustrative purposes only, as the data entities and any information associated with them (e.g., version numbers and/or identifiers) may be stored in any suitable format using any suitable data structure(s), as aspects of the technology described herein are not limited in this respect.

In some embodiments, different devices may use the same identifiers to refer to primary and backup copies of the same data entities. For example, a primary device for a group of data entities and the backup device(s) for the group of data entities may store the same identifiers for the data entities and their copies. In other embodiments, however, different devices may use different identifiers to refer to primary and backup copies of the same data entities. For example, a primary device for a group of data entities may use one set of identifiers for the group of data entities and the backup device(s) may use a different set of identifiers for the group of data entities. In such embodiments, the primary and/or backup device(s) may be programmed to map the different sets of identifiers to one another.

During operation of the data processing system 100, primary copies of data entities may be accessed more frequently than their backup copies. Accordingly, in embodiments where on-heap volatile memory is used to store primary copies of data entities and off-heap volatile memory is used to store backup copies of data entities, the data processing system 100 may be configured to manage data stored in on-heap volatile memory and data stored in off-heap volatile memory in different ways so as to improve the overall responsiveness of the system. For example, data processing system 100 may manage data in off-heap volatile memory without using automatic garbage collection and may manage data in on-heap volatile memory by using automatic garbage collection. As another example, data processing system 100 may manage data in off-heap volatile memory by accessing and/or writing data in large contiguous blocks of memory, but not require that such contiguous blocks be used in on-heap memory. In this way, the data processing system 100 may be able to more rapidly handle access requests for primary copies of the data entities it manages, which is important in high-throughput applications.

In the illustrative example, shown in FIG. 1B, of how data processing system 100 manages data entities and their respective copies across multiple devices, each of the computing devices 108, 110, and 112 stores either a primary or a backup copy of each data entity managed by the data processing system. For example, primary copies of data entities D1-D5 are stored in on-heap memory of computing device 108 and secondary copies of these data entities are stored in off-heap memories of both computing devices 110 and 112. However, a data processing system need not store a copy of each data entity on each computing device in the data processing system, as aspects of the technology described herein are not limited in this respect.

Figure 1C:
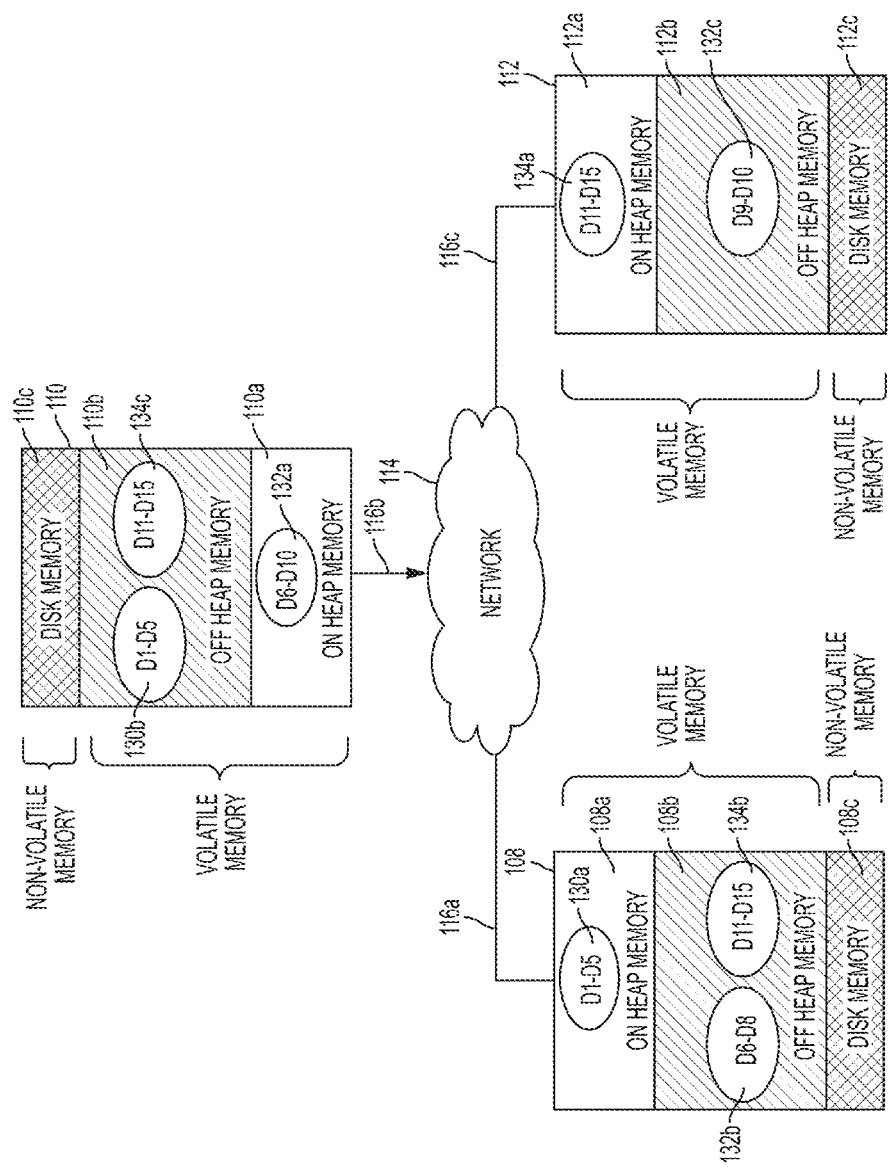
FIG. 1C illustrates an example of how the data processing system of FIG. 1A may manage data entities and their respective copies across multiple devices, in accordance with some embodiments of the technology described herein.
Figure 1D:
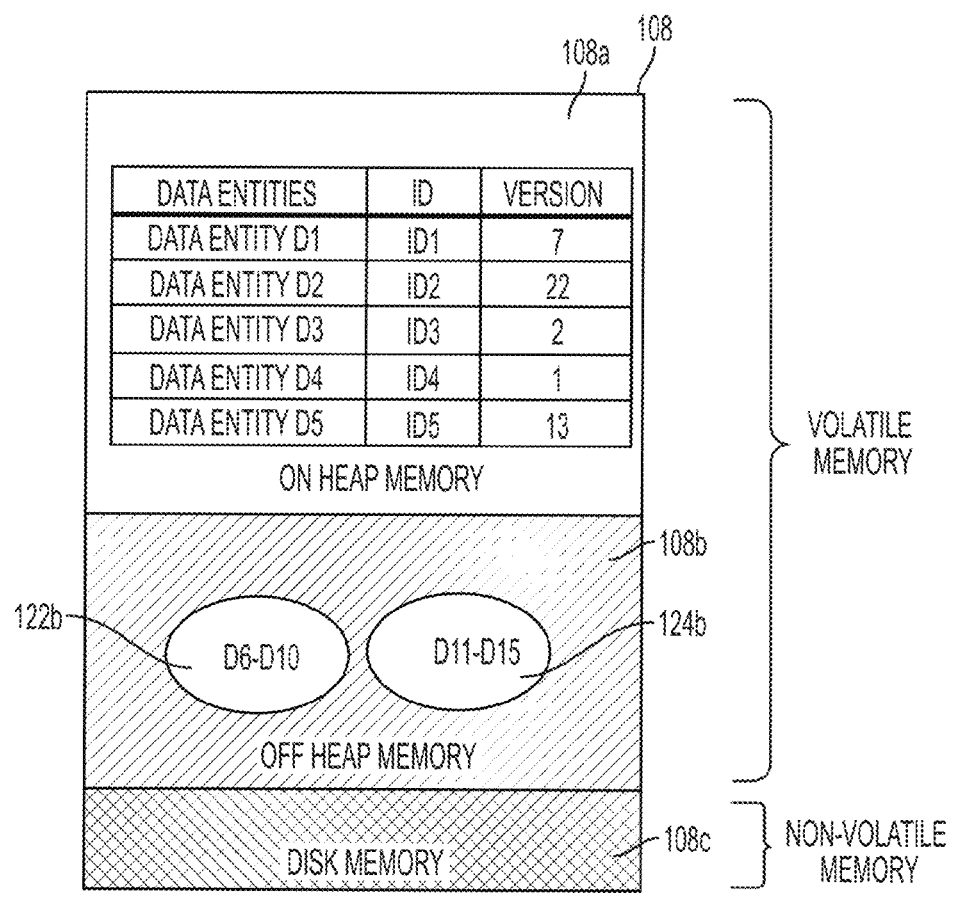
FIG. 1D illustrates an example of information stored by a device in the data processing system, in accordance with some embodiments of the technology described herein.

As shown in the illustrative example of FIG. 1C, for example, data processing system 100 may store backup copies of some data entities only on some of the computing devices configured to operate as backup devices (i.e., configured to store backup copies of data entities) in the data processing system. For example, data processing system 100 may be configured to store primary copies of data entities D1-D5 as data entities 130a in on-heap memory 108a of computing device 108 and backup copies of these data entities as data entities 130b in off-heap memory of computing device 110. In this configuration, computing device 112c does not store any backup copies of data entities D1-D5. Other data entities may be stored, either as primary or backup copies, on all the computing devices. For example, as shown in FIG. 1C, primary copies of data entities D11-D15 may be stored as data entities 134a on computing device 112 and backup copies 134b and 134c of these data entities may be stored on computing devices 108 and 110, respectively.

In some embodiments, the data processing system 100 may be configured to determine which device(s) to use for storing backup copies of data entities. This may be done in any suitable way. For example, the data processing system 100 may be configured to determine, for each data entity, which device(s) to use for storing backup copies of that data entity. Making such a determination at a data-entity level may result in data entities that have their primary copies stored on the same computing device, but have their backup copies stored on different devices. For example, as shown in FIG. 1C, primary copies of data entities D6-D10 are stored as data entities 132a in on-heap memory 110a of computing device 110, backup copies of data entities D6-D8 are stored as data entities 132b in off-heap memory 108b of computing device 108, and backup copies of data entities D9-D10 are stored as data entities 132c in off-heap memory 112c of computing device 112. In this example, computing device 108 does not store backup copies of data entities D9-D10 and computing device 112 does not store backup copies of data entities D6-D8. As another example, the data processing system may be configured to determine, for each group of data entities sharing a primary device, which device(s) to use for storing backup copies of all the entities in the group. In this configuration, each backup device storing a backup copy of any data entity in the group would also store backup copies of all other data entities in the group.

In some embodiments, the data entities maintained by the data processing system 100 may be updated. For example, one or more new data entities may be added to the set of data entities being managed by the system. As another example, one or more data entities being managed by the data processing system may be deleted. As yet another example, the contents of one or more of the data entities managed by the data processing system may be changed. As yet another example the contents of one or more of the data entities managed by the data processing system may be replaced. In some embodiments, data processing system 100 may update one or more of data entities it manages using a replication process developed by the inventors and described below with reference to FIG. 2.

Figure 2:
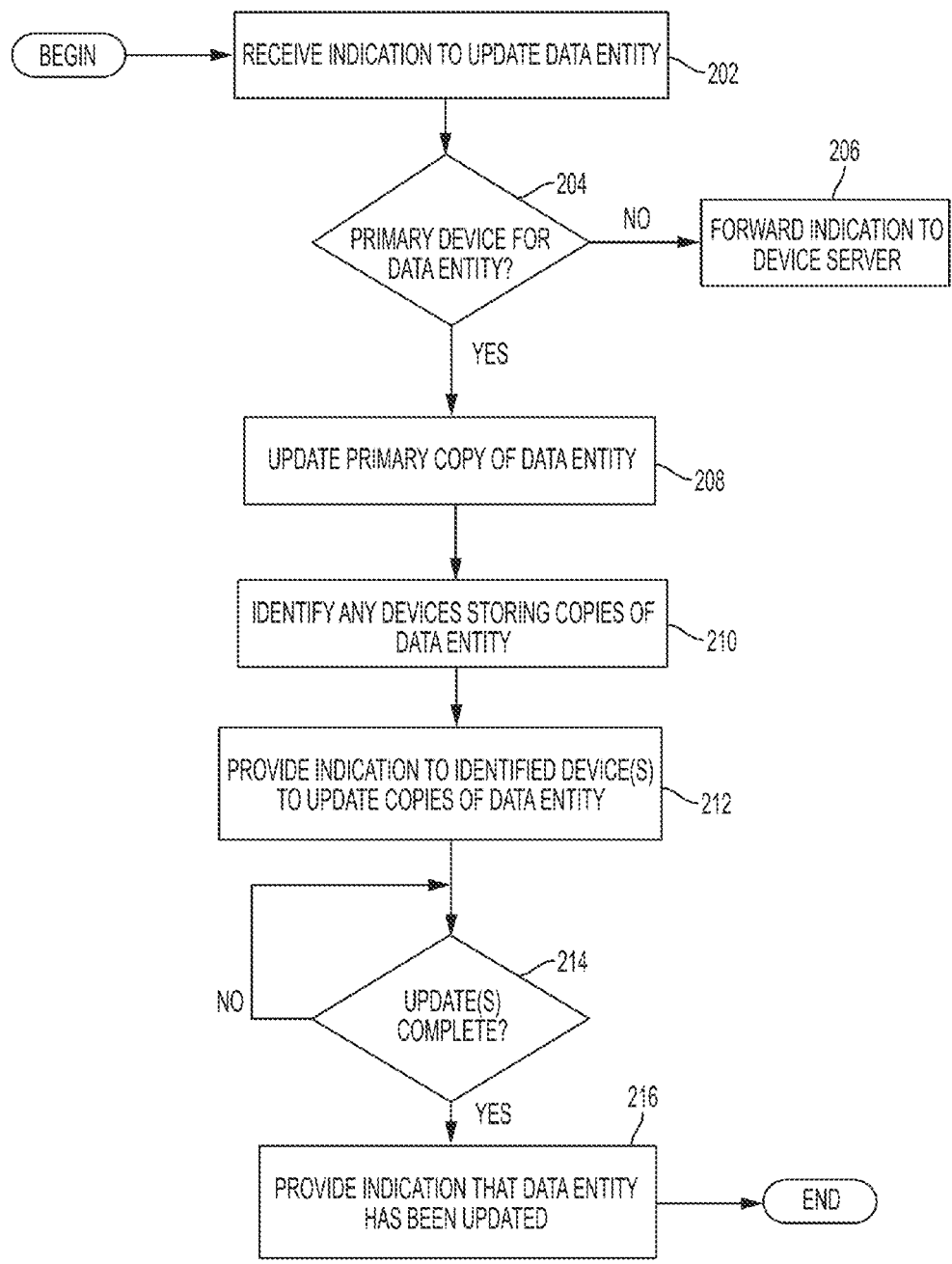
FIG. 2 is flow chart of an illustrative process for updating a data entity stored on a device and one or more of its copies stored on one or more other devices, in accordance with some embodiments of the technology described herein.

FIG. 2 is flow chart of an illustrative process 200 for updating a data entity stored on a device and one or more of its copies stored on one or more other devices, in accordance with some embodiments of the technology described herein. Process 200 may be performed by any suitable data processing system and, for example, may be performed by data processing system 100 described above.

Process 200 begins at act 202, where a computing device in the data processing system receives an indication to update a data entity. The indication may be an indication to add a new data entity to those being managed by the data processing system, an indication to delete a data entity managed by the data processing system, or an indication to change the data in a data entity managed by a data processing system. As a non-limiting example, with reference to the data entities 106 managed by the data processing system 100, the indication may be an indication to add a new data entity D16 to data entities 106, delete data entity D9 from data entities 106, or to change the values of data in data entity D3 of data entities 106. The indication may be received from any suitable source including, for example, a device external to the data processing system, from another device part of the data processing system, or be generated by software (automatically or in response to user input) executing on the computing device receiving the indication. In some instances, the indication may be received in response to a user of the data processing system providing an indication that the data entity is to be updated.

In some embodiments, the indication received at act 202 may include information identifying the data entity to be updated. When the indication is an indication that the values of data in a data entity are to be changed, the indication may include the new data values. When the indication is an indication that a new data entity is to be added, the indication may include at least some (e.g., all) of the data that is to be part of the new data entity. The indication may be in any suitable format, as aspects of the technology are not limited in this respect.

Next, process 200 proceeds to decision block 204, where it is determined whether the computing device that received an indication to update a data entity is the primary device for the data entity. That is, a determination is made at decision block 204 as to whether the computing device stores (or is to store in cases where a new data entity is being added) a primary copy of the data entity to be updated. This determination may be made in any suitable way. For example, in some embodiments, the indication to update the data entity may include information identifying the data entity and this information may be used to identify (e.g., via a look-up table, a mapping, or in any other suitable way) the primary device for the data entity and to determine whether the computing device that received the indication is the identified primary device.

When it is determined, at decision block 204, that the computing device that received the indication to update a data entity is not the primary device for the data entity, process 200 proceeds to act 206 where the indication is forwarded to the primary device for the data entity. For example, if computing device 108 received an indication to update data entity D6, whose primary copy is stored in the volatile memory of computing device 110, computing device 108 may determine, at decision block 204, that computing device 110 is the primary device for data entity D6 and, at act 206, may forward the indication to computing device 110.

On the other hand, when it is determined at decision block 204, that the computing device that received the indication to update the data entity is the primary device for the data entity, process 200 proceeds to act 208, where the primary copy of the data entity is updated on the primary device.

After the primary copy of the data entity is updated on the primary device, process 200 proceeds to act 210, where the device(s) storing backup copies of the data entity are identified. Information identifying the data entity may be used to determine the backup device(s) for the data entity, for example, via a look-up table, a mapping or in any other suitable way. For example, if computing device 108 received an indication to update the data entity D3, the data processing system may determine, at act 210, that computing devices 110 and 112 each store copies of the data entity D3.

After the backup device(s) are identified, the primary device provides, at act 212, an indication to update the data entity to the backup device(s) identified at act 210.

Next, process 200 proceeds to decision block 214, where it is determined whether the data entity has been updated on the backup device(s) identified at act 210. This determination may be made in any suitable way. For example, it may be determined that the data entity has been updated on the backup device(s) identified at act 210 when the primary device receives acknowledgements from each of these backup device(s) indicating that their respective copies of the data entity have been updated. As another example, in instances where only a subset of the backup devices identified at act 210 is accessible (e.g., due to network connectivity or power issues), it may be determined that the data entity has been updated on the backup device(s) identified at act 210 when the primary device receives acknowledgements from each of the accessible backup device(s) indicating that their respective copies of the data entity have been updated. In such instances, the data processing system may store (e.g., on the primary device) any information needed to update the copies of the data entities on the inaccessible backup devices at a later time when such devices are accessible.

Until it is determined, at decision block 214, that the data entity has been updated on the backup device(s) identified at act 210, process 200 waits until the update(s) are completed. On the other hand, when it is determined, at decision block 214, that copies of the data entity have been updated on the backup device(s), process 200 proceeds to act 216, where an indication is provided that the data entity has been updated. The indication may be one that is provided to a user or to a computer program that requested the update to the data entity. Additionally or alternatively, providing the indication may include storing information (e.g., in a log) indicating that the data entity has been updated. After act 216, process 200 completes.

It should be appreciated that process 200 is illustrative and that variations of process 200 are possible. For example, in some embodiments, the order of one or more acts in process 200 may be changed. As a specific example, acts 208, 210, and 212 may be performed in any suitable order. As another specific example, in some embodiments, the primary copy of the data entity may be updated only after it has been determined, at decision block 214, that the copies of the data entity have been updated.

As described above, copies of data entities managed by an in-memory data processing system may become unsynchronized due to events such as network outages and/or power outages. The inventors have developed a low-bandwidth manifest-based resynchronization technique to efficiently synchronize data entities managed by a data processing system based, at least in part, on version numbers associated with the data entities. As described in more detail below, the technique involves maintaining version numbers for each copy of a data entity managed by the data processing system and using these version numbers to identify out-of-synch data entities and efficiently resynchronize them.

Figure 3A:
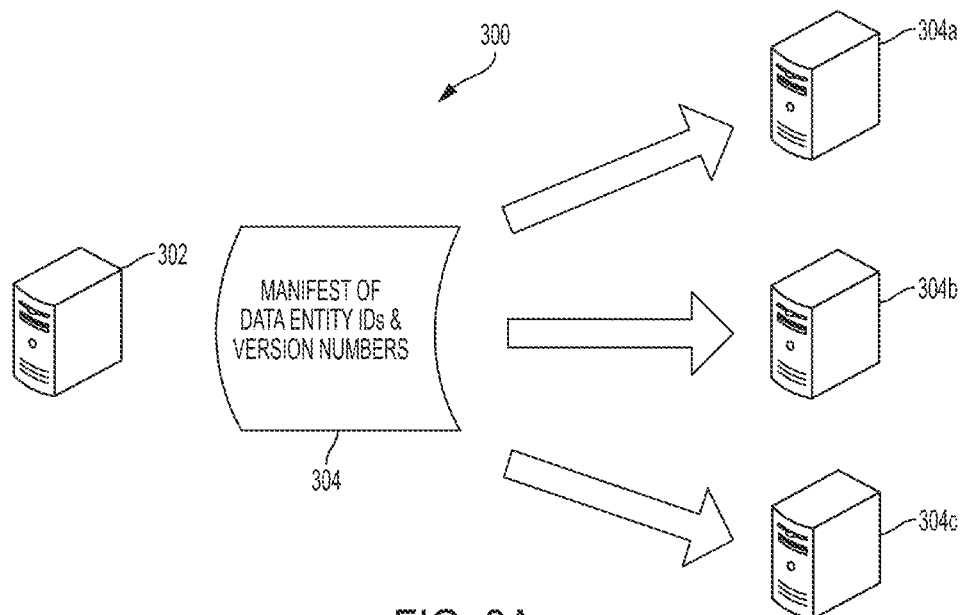
FIGS. 3A, 3B, and 3C illustrate manifest-based resynchronization, in accordance with some embodiments of the technology described herein.
Figure 3B:
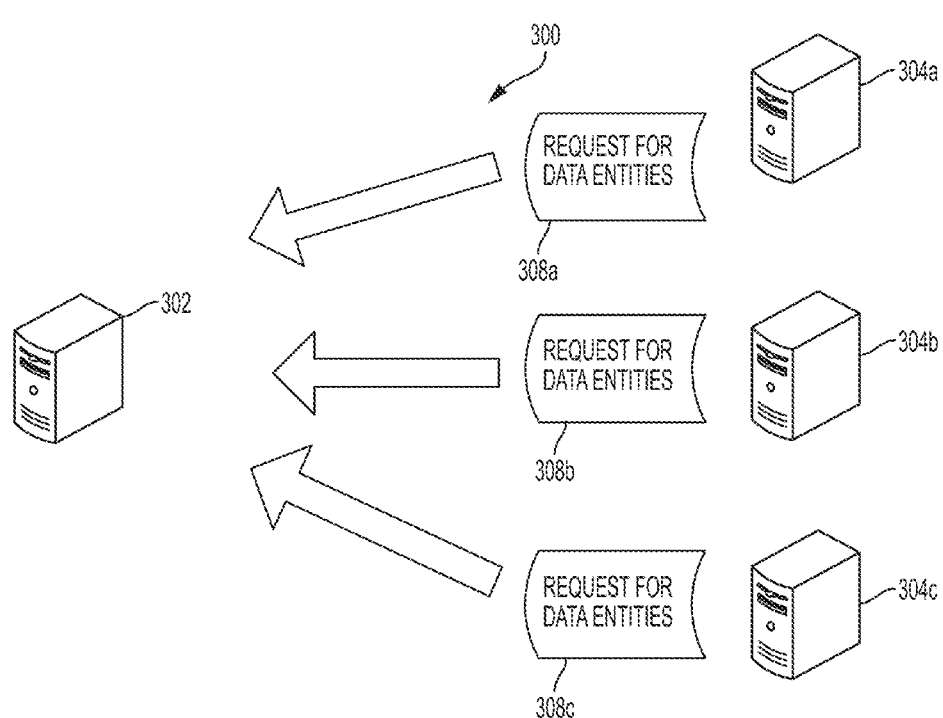
Figure 3C:
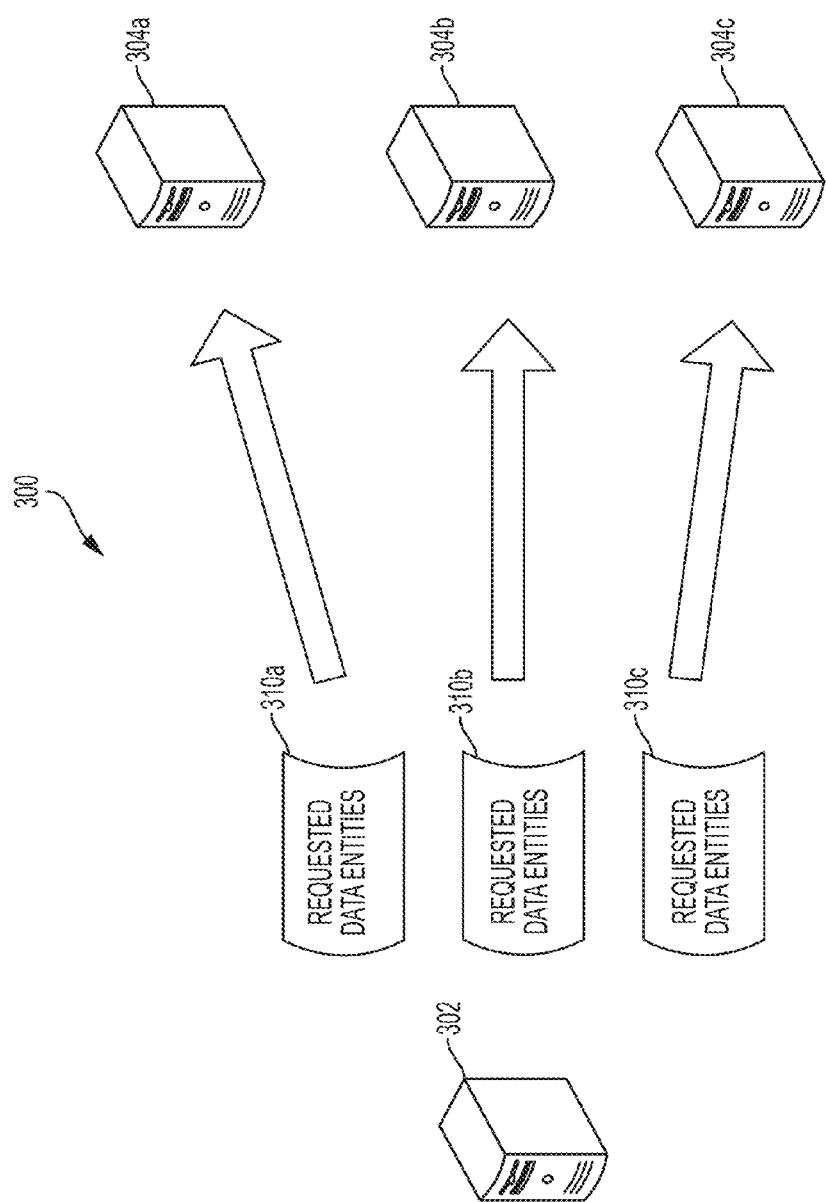

FIGS. 3A, 3B, and 3C illustrate manifest-based resynchronization in a data processing system 300, in accordance with some embodiments of the technology described herein. Data processing system 300 includes computing devices 302, 304a, 304b, and 304c, each of which may be any suitable type of computing device. Computing device 302 is a primary device for a group of data entities and stores primary copies of these data entities in its volatile memory. Backup copies of data entities in the group are stored in volatile memories of computing devices 304a, 304b, and 304c. Each of computing devices 302, 304a, 304b, and 304c stores a respective local version number for each data entity stored in its volatile memory.

As shown in FIG. 3A, in response to an indication to perform resynchronization, computing device 302: (1) generates a manifest 304 including information identifying data entities for which computing device 302 is a primary device and their respective version numbers; and (2) provides the generated manifest to any computing device(s) that store backup copies of any data entities for which computing device 302 is a primary device. In the illustrative example of FIG. 3A, computing devices 304a, 304b, and 304c each store one or more backup copies of the data entities whose primary copies are stored on computing device 302. Accordingly, computing device 302 provides manifest 304 to computing devices 304a, 304b, and 304c.

Next, each of the computing devices 304a, 304b, and 304c may compare the version numbers in the manifest 304 to local version numbers of the backup copies of the data entities stored in their respective volatile memories. Based on results of these comparisons, each of the computing devices 304a, 304b, and 304c may identify data entities that are out-of-synch with their primary copies. For example, computing device 304a may determine that a backup copy of a data entity stored on computing device 304a is out of synch with its primary copy stored on computing device 302 when the version number of that data entity as indicated in manifest 304 is different from (e.g., higher than) the local version number maintained by computing device 304a for that particular data entity. As shown in FIG. 3B, after identifying the out-of-synch data entities, each of computing devices 304a, 304b, and 304c send respective requests 308a, 308b, and 308c for updated copies of the out-of-synch data entities to computing device 302. In response to these requests, computing device 302 sends the requested data entities to each of the computing devices 304a, 304b, and 304c. As shown in FIG. 3C, for example, computing device 302 sends to computing device 304a the data entities 310a it requested in request 308a. Similarly, computing device 302 sends to computing device 304b the data entities 310b it requested in request 308b and sends to computing device 304c the data entities 310c it requested in request 308c.

As illustrated in FIGS. 3A, 3B, and 3C, the manifest-based resynchronization technique developed by the inventors does not require that contents of all data entities stored on computing device 302 be transmitted to computing devices 304a, 304b, and 304c. Instead, only information identifying the data entities and their versions is transmitted. Because information identifying a data entity may constitute a significantly smaller amount of data than the data entity itself (e.g., ten times less data, one hundred times less data, one thousand times less data, ten thousand time less data, one million times less data, etc.), transmitting such identifying information instead of the data entity itself reduces the communications burden that resynchronization places on the network of the data processing system resulting in improvement in its overall operating efficiency. Moreover, transmitting only out-of-synch data entities further reduces the communications load.

Figure 4A:
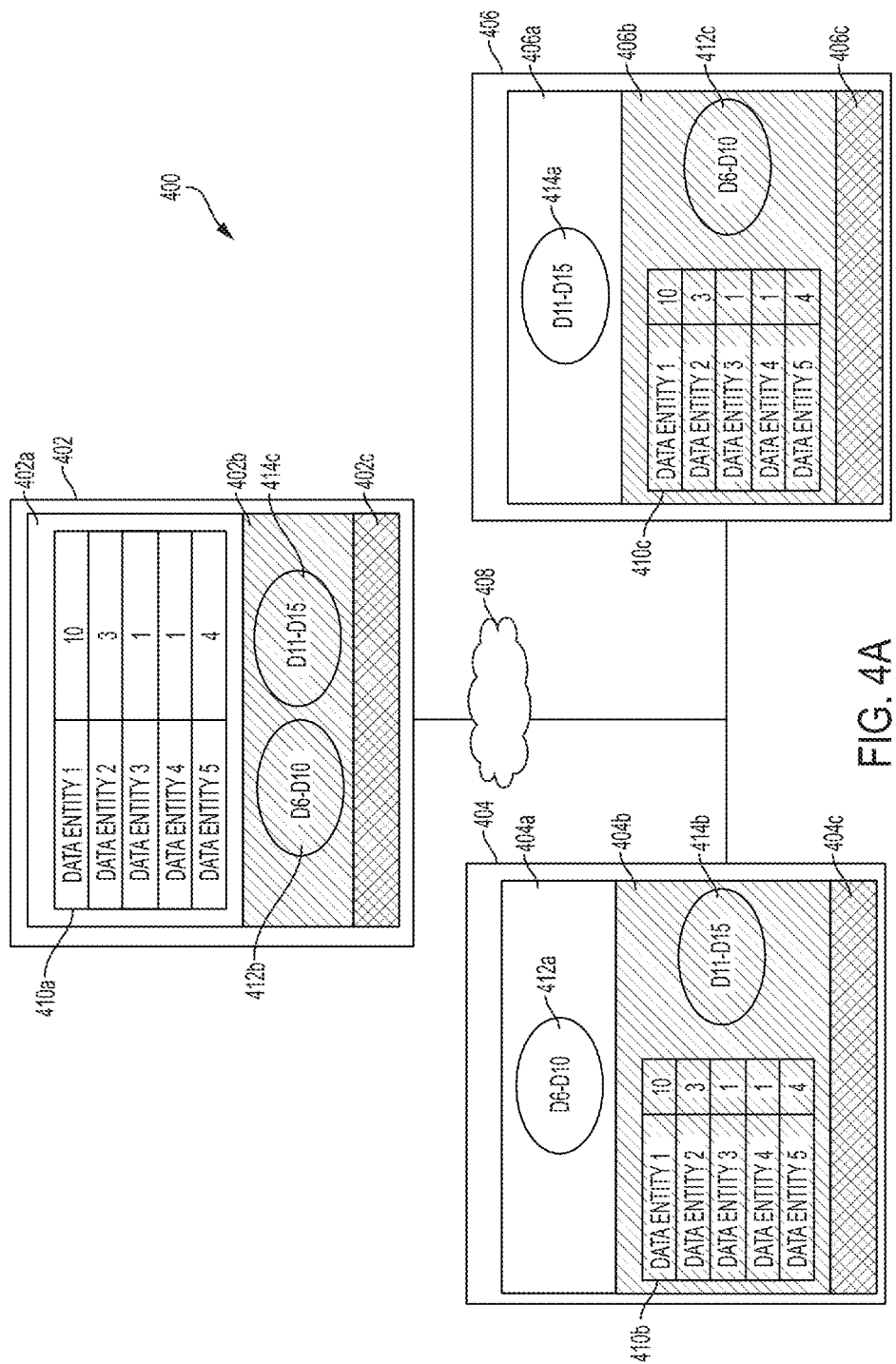

FIGS. 4A, 4B, 4C, 4D, 4E, and 4F show a more detailed illustrative example of manifest-based resynchronization in a data processing system 400, in accordance with some embodiments of the technology described herein. As shown in FIG. 4A, data processing system 400 includes computing devices 402, 404, and 406. Each of computing devices 402, 404, and 406 may be any suitable type of computing device such as a fixed device or a portable device. For example, each of computing devices 402, 404, and 406 may be a server. Computing devices 402, 404, and 406 are communicatively coupled via network 408, which may be any suitable type of network, examples of which are provided herein (e.g., with reference to network 114 shown in FIG. 1A).

Computing device 402 includes on-heap volatile memory 402a, off-heap volatile memory 402b, and non-volatile memory 402c. Computing device 402 stores primary copies 410a of data entities D1-D5 in on-heap volatile memory 402a, backup copies 412b of data entities D6-D10 in off-heap volatile memory 402b, and backup copies 414c of data entities D11-D15 in off-heap volatile memory 402b. Computing device 402 stores local version numbers for each of the primary copies of data entities D1-D5. The version numbers of data entities D1, D2, D3, D4, and D5 are 10, 3, 1, 1, and 4, respectively. Although not explicitly shown in FIG. 4A, computing device 402 also stores local version numbers for each of the backup copies 412b and 414c of data entities D6-D15.

Computing device 404 includes on-heap volatile memory 404a, off-heap volatile memory 404b, and non-volatile memory 404c. Computing device 404 stores primary copies 412a of data entities D6-D10 in on-heap volatile memory 404a, backup copies 410b of data entities D1-D5 in off-heap volatile memory 404b, and backup copies 414b of data entities D11-D15 in off-heap volatile memory 404b. Computing device 404 stores local version numbers for each of the backup copies of data entities D1-D5. The version numbers of backup copies of data entities D1, D2, D3, D4, and D5 are 10, 3, 1, 1, and 4, respectively. Although not explicitly shown in FIG. 4A, computing device 404 also stores local version numbers for each of the primary copies 412a of data entities D6-D10 and for each of the backup copies 414b of data entities D11-D15.

Computing device 406 includes on-heap volatile memory 406a, off-heap volatile memory 406b, and non-volatile memory 406c. Computing device 406 stores primary copies 414a of data entities D11-D15 in on-heap volatile memory 406a, backup copies 410c of data entities D1-D5 in off-heap volatile memory 406b, and backup copies 412c of data entities D6-D10 in off-heap volatile memory 406b. Computing device 406 stores local version numbers for each of the backup copies of data entities D1-D5. The version numbers of backup copies of data entities D1, D2, D3, D4, and D5 are 10, 3, 1, 1, and 4, respectively. Although not explicitly shown in FIG. 4A, computing device 406 also stores local version numbers for each of the primary copies 414a of data entities D11-D15 and for each of the backup copies 412c of data entities D6-D10.

Figure 4B:
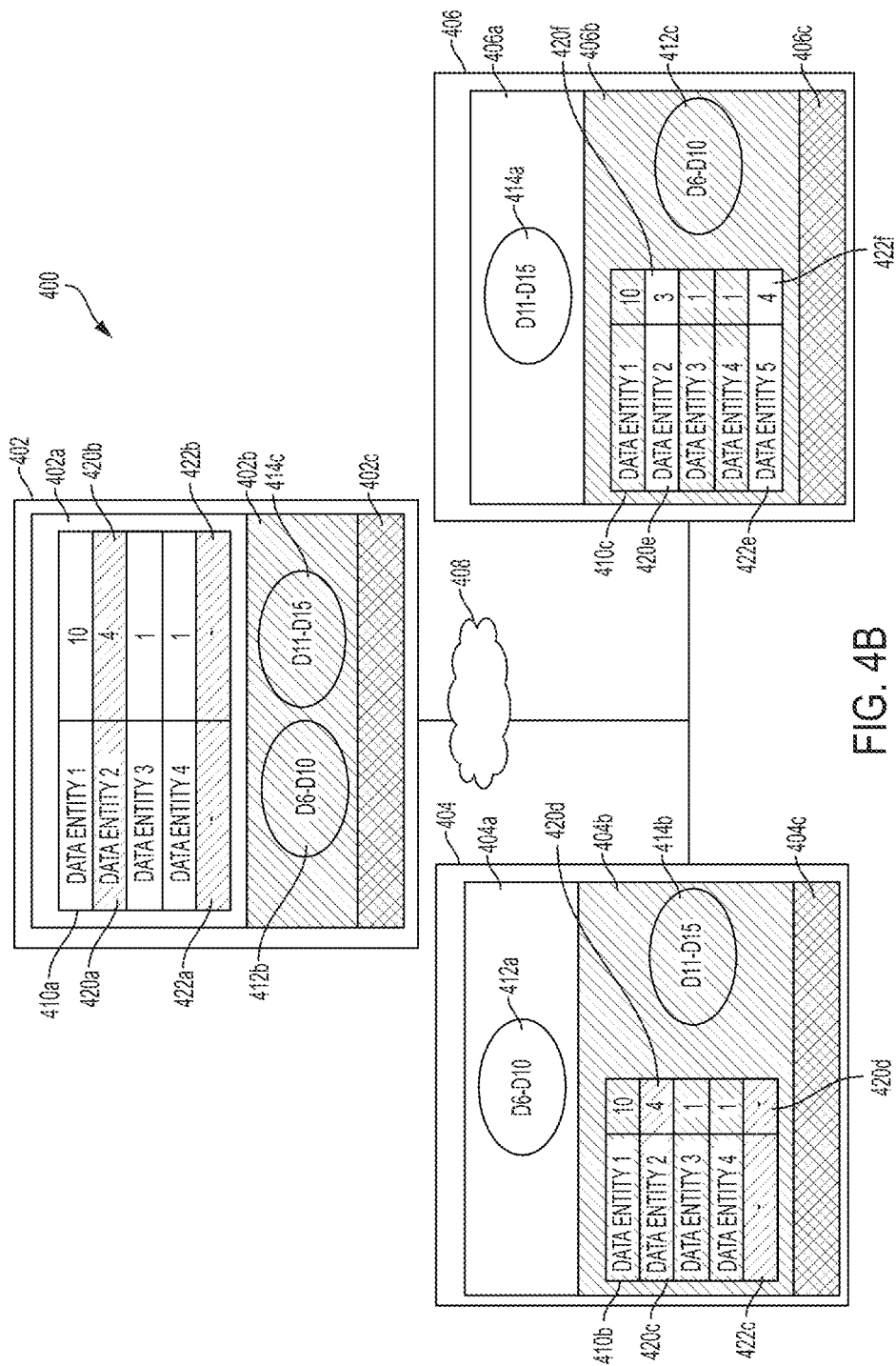

As may be seen from comparing the local version numbers of data entities D1-D5 shown in FIG. 4A, the data entities D1-D5 are synchronized across computing devices 402, 404 and 406. By contrast, FIG. 4B illustrates a situation where the various copies of data entities D1-D5 are no longer synchronized across these computing devices. As shown in FIG. 4B, the primary copy 420a of data entity D2 has been updated and its version number 420b has been incremented from three to four. In addition, as seen in entries 422a and 422b, the primary copy of data entity D5 has been deleted. These changes (i.e., the updating of data entity D2 and deletion of data entity D5) have been propagated to computing device 404, which stores a backup copy 420c of data entity D2 having the same version number 420d (i.e., 4) as that of the primary copy 420a of data entity D2. In addition, as seen in entries 422c and 422d, the backup copy of data entity D5 has been deleted from computing device 404. However, the changes to data entities D2 and D5 were not propagated to computing device 406 (e.g., because computing device 406 may have been inaccessible while the updates were taking place). As shown in FIG. 4B, computing device 406 stores a backup copy 420e of data entity D2 having version number 420f of three, not 4 like the primary copy). In addition, as seen in entries 422e and 422f, the backup copy of data entry D5 has not been deleted from computing device 406.

Figure 4C:
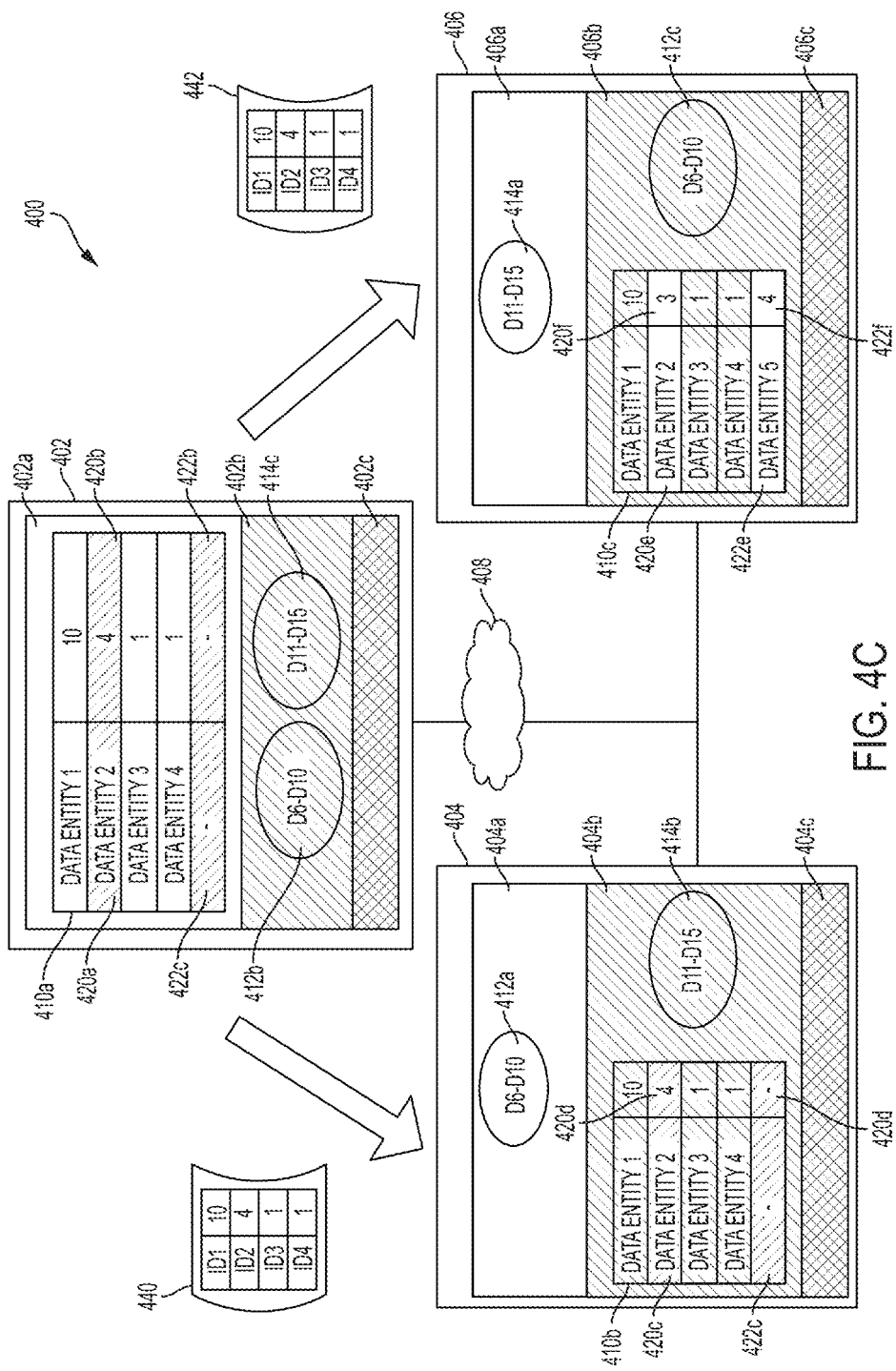

FIGS. 4C-4F illustrates how the manifest-based resynchronization technique developed by the inventors may be used to resynchronize the data entities D1-D5 across the computing devices 402, 404, and 406. First, as shown in FIG. 4C, computing device 402 transmits manifests 440 and 442 to computing devices 404 and 406, respectively. Each of manifests 440 and 442 includes information identifying data entities for which the computing device 402 stores primary copies and their respective version numbers. Manifests 440 and 442 do not include any information identifying data entity D5 because computing device 402 no longer stores a primary copy of data entity D5, as it has been deleted.

Next, computing devices 404 and 406 compare the version numbers in manifests 440 and 442, respectively, to the local version numbers stored by these devices. As shown in FIG. 4D, computing device 404 determined that all of its copies of data entities D1-D4 were in synch with their primary copies because the local version numbers of these data entities matched their respective counterparts in manifest 440. On the other hand, computing device 406 determined that its backup copy 420e of data entity D2 was out of synch with the primary copy of entity D2 because version number 420f (i.e., 3) did not match its respective counterpart in manifest 442 (i.e., 4). Accordingly, computing device 406 sent a request 444 to computing device 402 in order to obtain an updated version of data entity D2.

Figure 4E:
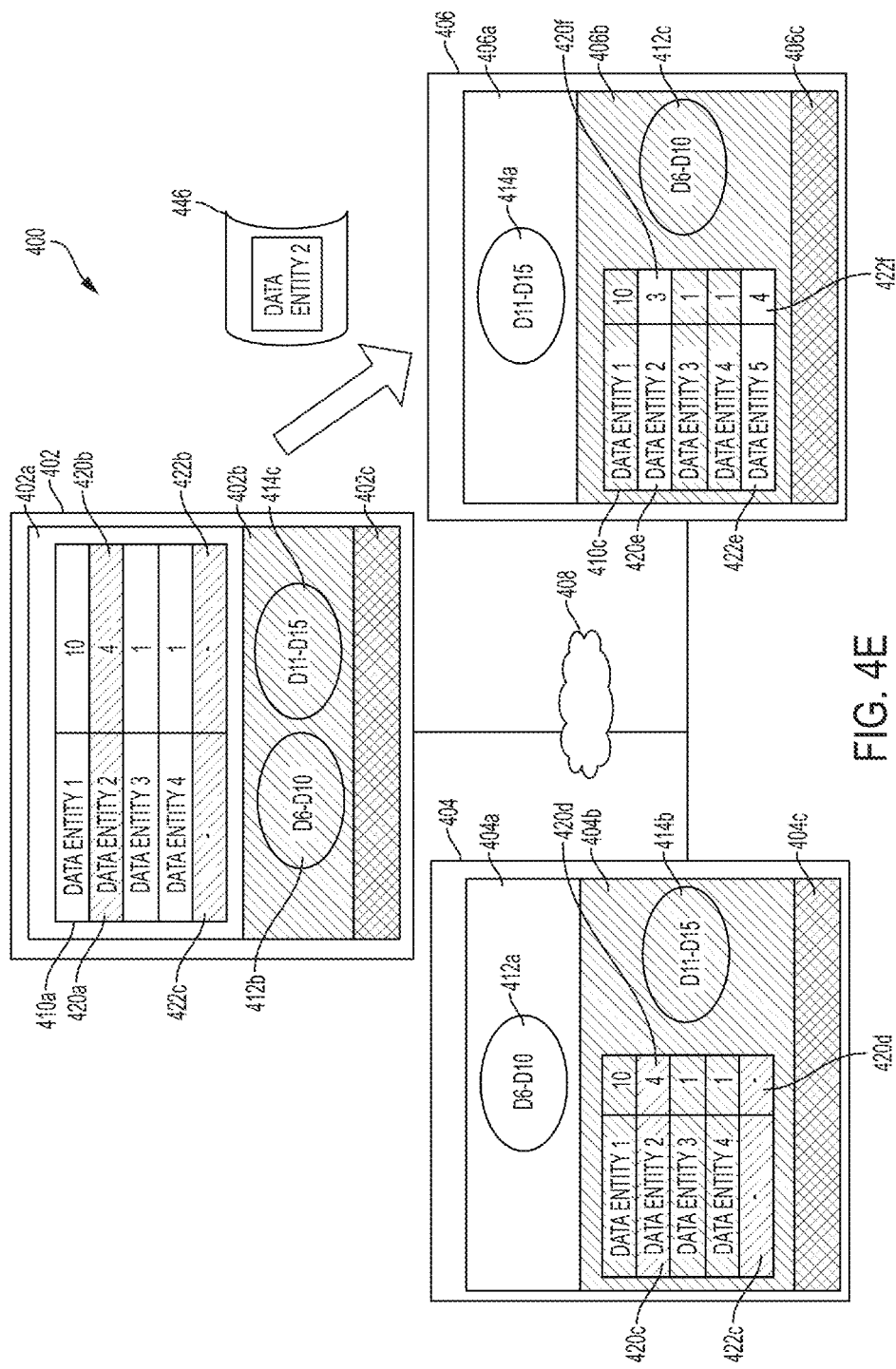
Figure 4F:
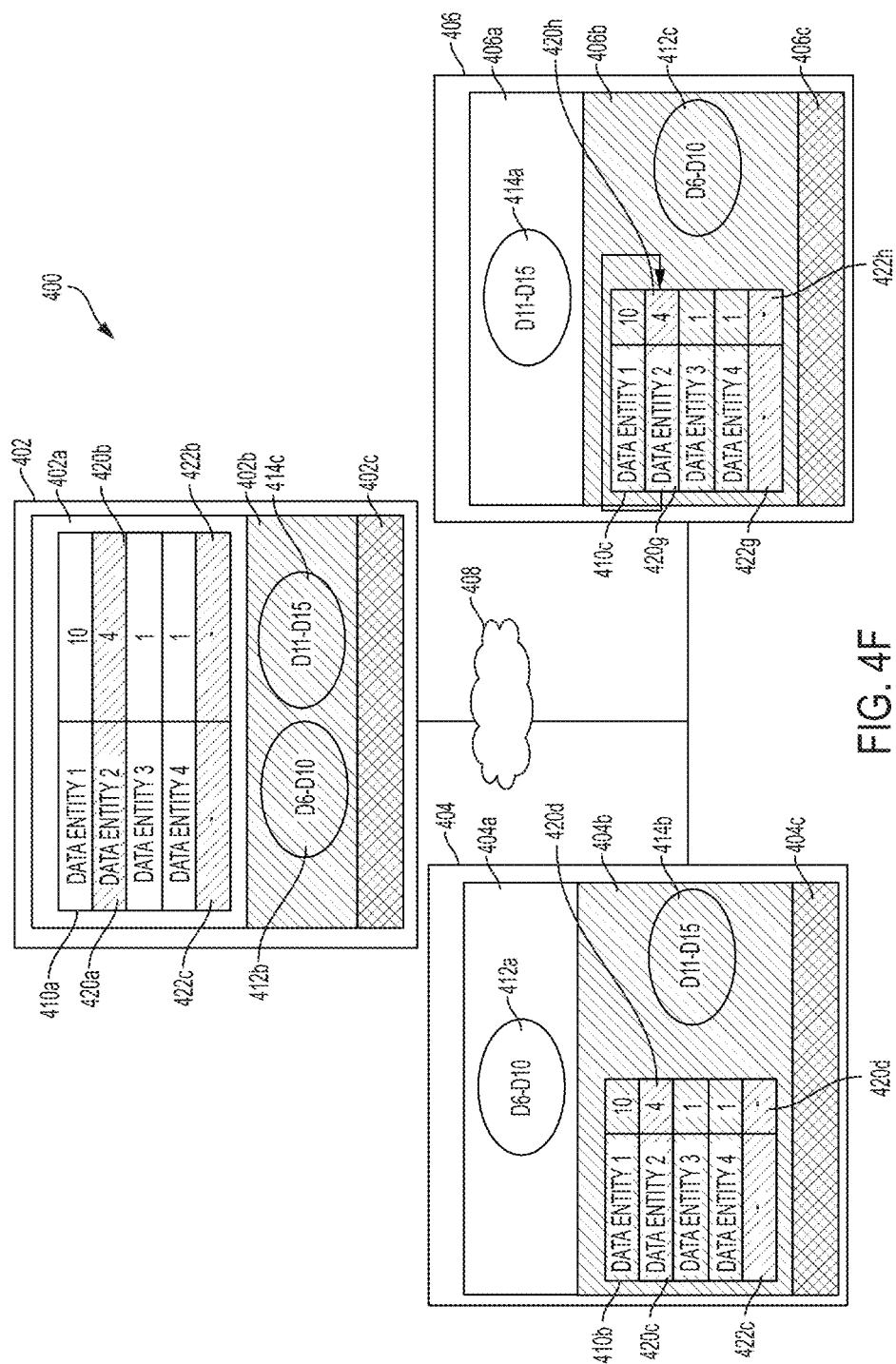

As shown in FIG. 4E, in response to receiving the request 444, computing device 402 transmits the latest version of data entity D2 in message 446. In turn, as shown in FIG. 4F, computing device 406 updates its copy of data entity D2 and stores backup copy 420g of data entity D2 having a version number 420h (i.e., 4) that matches the version number 420b of the primary copy 420a of this data entity. In addition, as can be seen from entries 422g and 422h, computing device 406 deletes its local copy of data entity D5 because the manifest 442 did not contain any information about data entity D5, which provides an indication that the primary copy of data entity D5 was deleted from computing device 402.

Accordingly, upon completion of the manifest-based resynchronization technique, the copies of data entities D1-D5 are once again synchronized across computing devices 402, 404, and 406, as shown in FIG. 4F.

Figure 5:
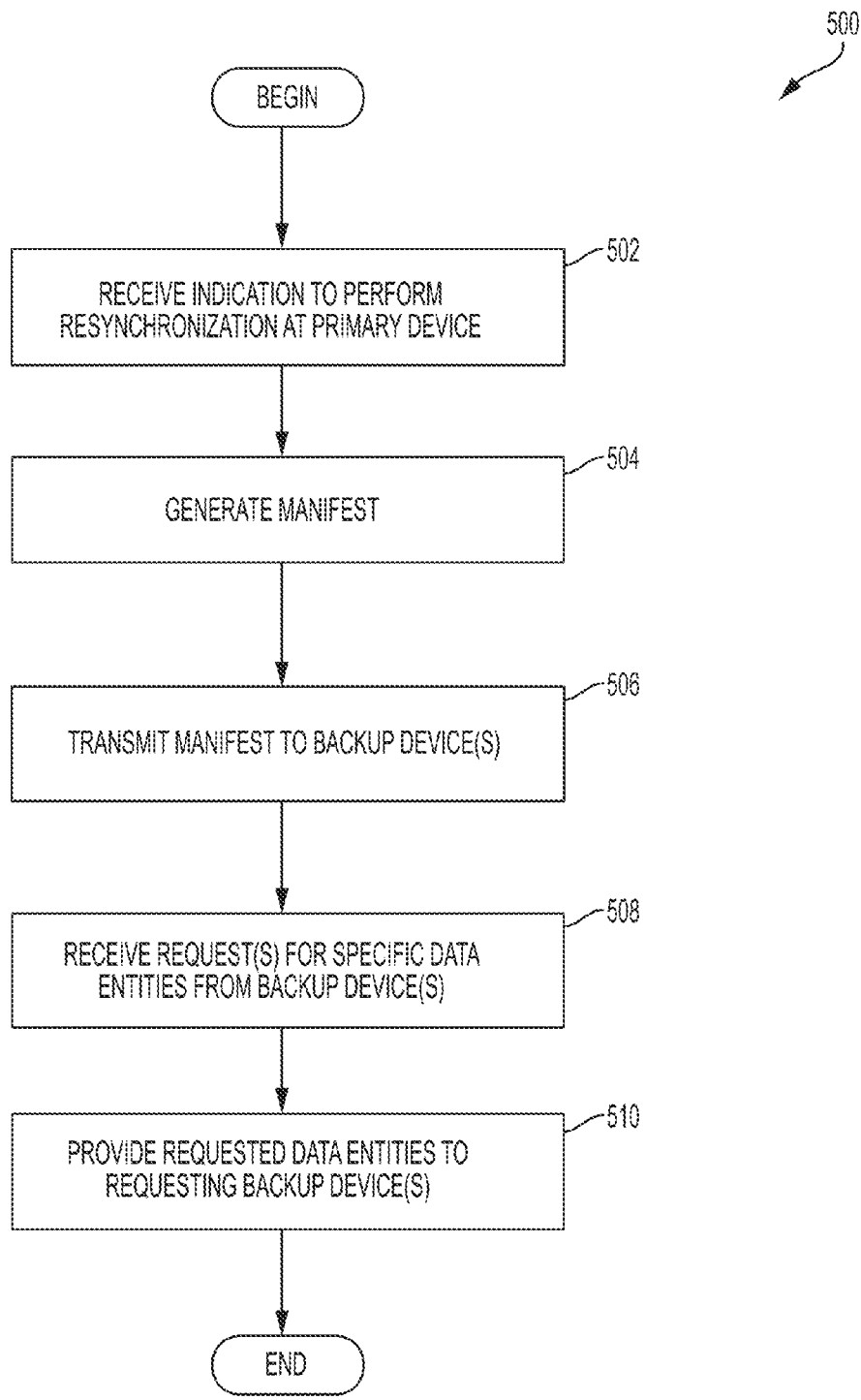
FIG. 5 is a flowchart of an illustrative process, performed by a computing device operating as a primary device for a set of data entities, for performing manifest-based resynchronization for the set of data entities, in accordance with some embodiments of the technology described herein.

FIG. 5 is a flowchart of an illustrative process 500, performed by a computing device operating as a primary device for a set of data entities managed by a data processing system, for performing manifest-based resynchronization for the set of data entities, in accordance with some embodiments of the technology described herein. Process 500 may be performed by any suitable computing device and, for example, may be performed by computing device 108 with respect to data entities D1-D5, by computing device 110 with respect to data entities D6-D10, and by computing device 112 with respect to data entities D11-D15.

Process 500 begins at act 502, where the primary device performing process 500 receives an indication to perform resynchronization. This indication may be received from any suitable source. For example, the data processing system may provide the indication to the primary device in response to receiving input from a user indicating that resynchronization is to be performed. As another example, the data processing system may determine, automatically without user input, that resynchronization is to be performed. In some embodiments, such a determination may be made automatically by the data processing system in response to detecting a network outage, a power outage, and/or any other event that may cause data entities managed by the data processing system to become unsynchronized. In other embodiments, the data processing system may resynchronize data entities it manages according to a predetermined schedule rather than in an event-driven manner.

In response to receiving an indication to perform resynchronization, the primary device executing process 500 generates, at act 504, a manifest having information identifying the data entities whose primary copies are stored by the primary device and their respective version numbers, which the primary device maintains. The primary device then transmits, at act 506, the generated manifest to any backup device(s) that store backup copies of one or more data entities whose primary copies are stored on the primary device.

Next, at act 508, the primary device receives requests for updated versions of one or more data entities from one or more of the backup devices to which a manifest was provided at act 506. In response to receiving the request(s), the primary device provides the updated data entities to the requesting backup devices, at act 510, and process 500 completes.

Although process 500 was described with reference to a single computing device part of a data processing system, the process may be performed by multiple devices in the data processing system. For example, in some embodiments, process 500 may be performed by multiple (e.g., all) computing devices that serve as primary devices for any data entities managed by the data processing system.

Figure 6:
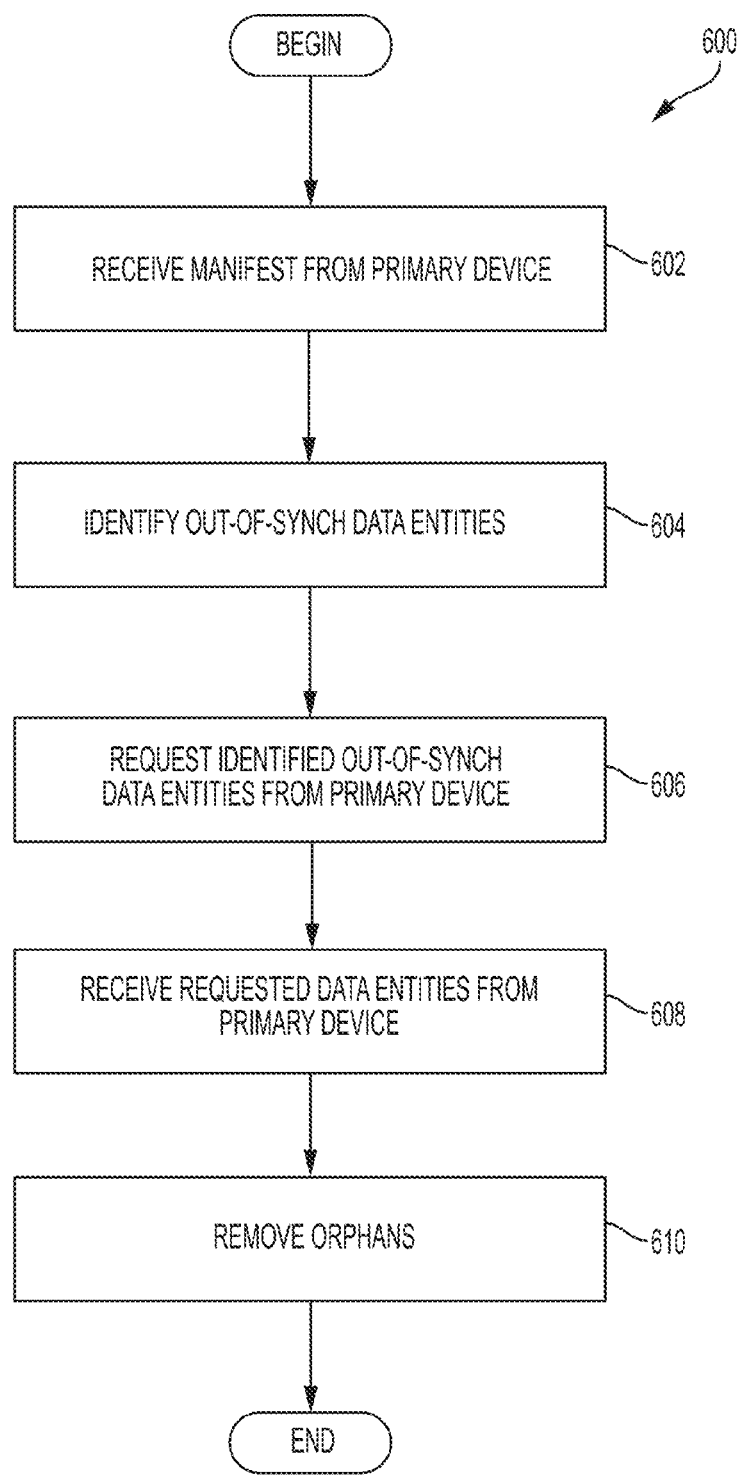
FIG. 6 is a flowchart of an illustrative process, performed by a computing device operating as a backup device for a set of data entities, for performing manifest-based resynchronization for the set of data entities, in accordance with some embodiments of the technology described herein.

FIG. 6 is a flowchart of an illustrative process 600, performed by a computing device operating as a backup device for a set of data entities, for performing manifest-based resynchronization for the set of data entities, in accordance with some embodiments of the technology described herein. Process 600 may be performed by any suitable computing device and, for example, may be performed by computing device 108 with respect to data entities D6-D11, by computing device 110 with respect to data entities D1-D5 and D11-D15, and by computing device 112 with respect to data entities D1-D10.

Process 600 begins at act 602, where the backup device executing process 600 receives a manifest from a primary device that stores primary copies of one or more data entities. The manifest includes information identifying each of the data entities whose primary copies are stored on the primary device and their respective version numbers.

Next, at act 604, the backup device executing process 600 identifies data entities stored on the backup device that are out of synch with their respective primary copies stored on the primary device. This may be done in any suitable way, for example, by comparing local version numbers of data entities as maintained by the backup device with the version numbers in the manifest provided by the primary device.

Next, at act 606, the backup device requests any out-of-synch data entities, identified at act 604, from the primary device. At act 608, the backup device receives the requested data entities from the primary device. Finally, at act 610, the backup device may remove any "orphan" data entities, which are data entities whose primary copies were deleted from the primary device and which were not identified in the manifest provided by the primary device at act 602. After the orphans are removed at act 610, the process 600 completes.

Figure 7:
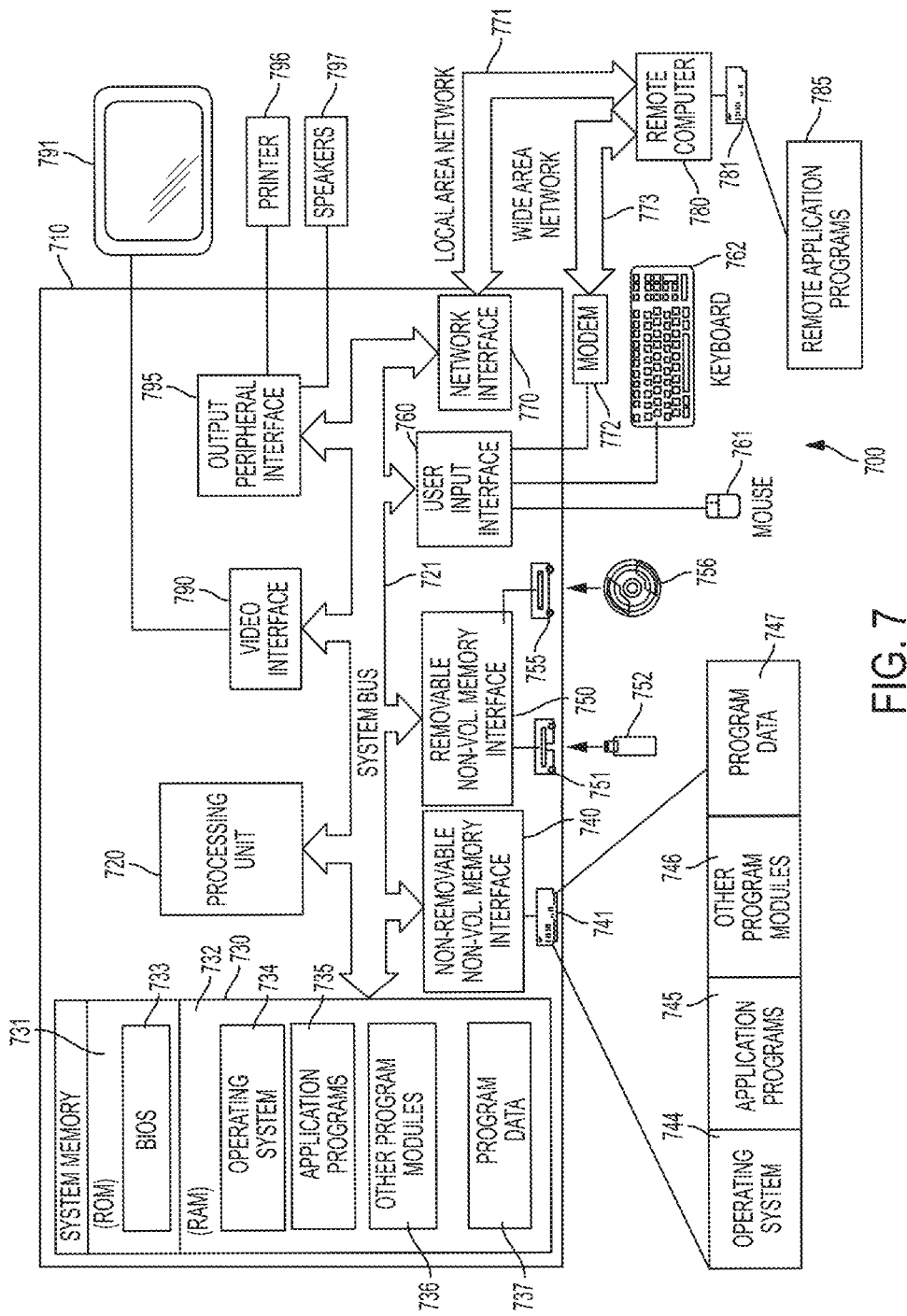
FIG. 7 is a block diagram of an illustrative computing system environment that may be used in implementing some embodiments of the technology described herein.

FIG. 7 illustrates an example of a suitable computing system environment 700 on which the technology described herein may be implemented. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture)

or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A data processing system configured to store a plurality of data entities in volatile memories of multiple computing devices, the data processing system comprising:
    a first computing device having a first volatile memory configured to store a first data entity, the first data entity associated with a first identifier; and
    a second computing device, different from and communicatively coupled to the first computing device, having a second volatile memory configured to store a copy of the first data entity associated with a second identifier,
    wherein the first computing device is configured to perform:
        receiving an indication to update the first data entity;
        after receiving the indication,
            updating the first data entity in the first volatile memory, and
            providing to the second computing device an indication to update the copy of the first data entity; and
        providing an indication that the first data entity has been updated, after receiving information from the second computing device indicating that the copy of the first data entity has been updated in the second volatile memory,
    wherein the first volatile memory comprises first on-heap memory, and wherein the first computing device is configured to store the first data entity in the first on-heap memory.

2. The system of claim 1, wherein the first volatile memory further comprises first off-heap memory.

3. The system of claim 2, wherein the second volatile memory comprises second on-heap memory and second off-heap memory, and wherein the second computing device is configured to store the copy of the first data entity in the second off-heap memory.

4. The system of claim 3, wherein the first computing device is communicatively coupled to a third computing device having a third volatile memory, the third volatile memory comprising third off-heap memory configured to store another copy of the first data entity, wherein the first computing device is further configured to perform:
    in response to the receiving, providing to the third computing device an indication to update the other copy of the first data entity; and
    providing the indication that the first data entity has been updated only after receiving information from the third computing device indicating that the other copy of the first data entity has been updated in the third volatile memory.

5. The system of claim 1, wherein the first computing device is communicatively coupled to multiple computing devices having respective volatile memories configured to store copies of the first data entity therein, the multiple computing devices including the second computing device, wherein the first computing device is further configured to perform:
    in response to the receiving, providing an indication to the multiple computing devices to update their respective copies of the first data entity; and providing the indication that the first data entity has been updated only after receiving information from each of the multiple computing devices indicating that its respective copy of the first data entity has been updated.

6. The system of claim 5, further comprising a plurality of computing devices, the plurality of computing devices comprising the multiple computing devices configured to store copies of the first data entity therein, wherein the first computing device is further configured to perform:
identifying, based on the first data entity, the multiple computing devices from among the plurality of computing devices.

7. The system of claim 1, wherein updating the first data entity in the first volatile memory is performed prior to providing to the second computing device an indication to update the copy of the first data entity.

8. The system of claim 1, wherein the first volatile memory is configured to store a plurality of data entities including the first data entity, wherein the second computing device is configured to store copies of data entities in the plurality of data entities, and wherein the first computing device is further configured to perform:
receiving an indication to perform resynchronization;
in response to receiving the indication to perform resynchronization, providing to
the second computing device information comprising an identifier and a version number for each of the plurality of data entities;
receiving, from the second computing device, information identifying at least one data entity in the first volatile memory that is not synchronized with its respective at least one copy in the second volatile memory; and
in response to receiving the information identifying the at least one data entity, providing to the second computing device the at least one data entity stored in the first volatile memory.

9. The system of claim 8, wherein the information identifying the at least one data entity consists of a first amount of information, and wherein the at least one data entity consists of a second amount of information that is at least at least ten thousand times greater than the first amount of information.

10. The system of claim 1, wherein:
the data processing system is configured to manage a set of at least ten million data entities, each data entity comprising at least a kilobyte of data; and
the plurality of data entities comprise the set of at least ten million data entities.

11. The system of claim 1, wherein the first identifier and the second identifier are the same identifier.

12. A method, performed by a first computing device having a first volatile memory configured to store a first data entity associated with a first identifier, the first computing device being communicatively coupled to a second computing device having a second volatile memory configured to store a copy of the first data entity associated with a second identifier, the second computing device being different from the first computing device, the method comprising:
receiving an indication to update the first data entity;
after receiving the indication,
updating the first data entity in the first volatile memory, and
providing to the second computing device an indication to update the copy of the first data entity; and
providing an indication that the first data entity has been updated, after receiving information from the second computing device indicating that the copy of the first data entity has been updated in the second volatile memory,
wherein the first volatile memory comprises first on-heap memory, and wherein the first computing device is configured to store the first data entity in the first on-heap memory.

13. The method of claim 12, wherein the first computing device is communicatively coupled to multiple computing devices having respective volatile memories configured to store copies of the first data entity therein, the multiple computing devices including the second computing device, the method further comprising:
in response to the receiving, providing an indication to the multiple computing devices to update their respective copies of the first data entity; and
providing the indication that the first data entity has been updated only after receiving information from each of the multiple computing devices indicating that its respective copy of the first data entity has been updated.

14. The method of claim 13, further comprising:
identifying, based on the first data entity, the multiple computing devices from among a plurality of computing devices.

15. The method of claim 12, wherein updating the first data entity in the first volatile memory is performed prior to providing to the second computing device an indication to update the copy of the first data entity.

16. The method of claim 12, wherein the first volatile memory is configured to store a plurality of data entities including the first data entity, wherein the second computing device is configured to store copies of data entities in the plurality of data entities, the method further comprising:
receiving an indication to perform resynchronization;
in response to receiving the indication to perform resynchronization, providing to
the second computing device information comprising an identifier and a version number for each of the plurality of data entities;
receiving, from the second computing device, information identifying at least one data entity in the first volatile memory that is not synchronized with its respective at least one copy in the second volatile memory; and
in response to receiving the information identifying the at least one data entity, providing to the second computing device the at least one data entity stored in the first volatile memory.

17. At least one non-transitory computer-readable storage medium storing processor executable instructions that, when executed by a first computing device having a first volatile memory configured to store a first data entity associated with a first identifier, cause the first computing device to perform a method, the first computing device being communicatively coupled to a second computing device having a second volatile memory configured to store a copy of the first data entity associated with a second identifier, the first computing device being different from the second computing device, the method comprising:
receiving an indication to update the first data entity;
after receiving the indication,
updating the first data entity in the first volatile memory, and
providing to the second computing device an indication to update the copy of the first data entity; and
providing an indication that the first data entity has been updated, after receiving information from the second computing device indicating that the copy of the first data entity has been updated in the second volatile memory, wherein the first volatile memory comprises first on-heap memory, and wherein the first computing device is configured to store the first data entity in the first on-heap memory.

18. A data processing system configured to store data entities in volatile memories of multiple computing devices, the data processing system comprising:

a first computing device having a first volatile memory configured to store a plurality of data entities, the plurality of data entities associated with first respective identifiers; and a second computing device, different from and communicatively coupled to the first computing device, having a second volatile memory configured to store copies of data entities in the plurality of data entities, the copies associated with second respective identifiers, wherein the first computing device is configured to perform:

receiving an indication to perform resynchronization;

providing, to the second computing device, information comprising an identifier and a version number for each of the plurality of data entities;

receiving, from the second computing device, information identifying at least one data entity stored in the first volatile memory that is not synchronized with its respective at least one copy in the second volatile memory; and in response to receiving the information, providing to the second computing device the at least one data entity stored in the first volatile memory, wherein the first volatile memory comprises first on-heap memory, and wherein the first computing device is configured to store the first data entity in the first on-heap memory.

19. The data processing system of claim 18, wherein the first volatile memory further comprises first off-heap memory.

20. The data processing system of claim 19, wherein the second volatile memory comprises second on-heap memory and second off-heap memory, and wherein the second computing device is configured to store copies of data entities in the plurality of data entities in the second off-heap memory.

21. The data processing system of claim 18, wherein the second volatile memory stores local version numbers for copies of data entities in the plurality of data entities, and wherein the second computing device is configured to perform:

receiving the information comprising an identifier and a version number for each of the plurality of data entities;

identifying, based at least in part on version numbers in the received information and the local version numbers, the at least one data entity stored in the first volatile memory that is not synchronized with its respective at least one copy in the second volatile memory; and providing, to the first computing device, information identifying the at least one data entity.

22. The data processing system of claim 18, wherein the first volatile memory is configured to store a version number for each of a plurality of data entities including a first version number for a first data entity in the plurality of data entities, and wherein the first computing device is configured to:

increment the first version number in response to updating the first data entity.

23. The data processing system of claim 18, wherein the second volatile memory is configured to store a first copy of the first data entity, and wherein the first computing device is configured to perform:

receiving an indication to update the first data entity;

in response to the receiving the indication,
updating the first data entity in the first volatile memory, and
providing to the second computing device an indication to update a copy of the first data entity stored in the second volatile memory; and providing an indication that the first data entity has been updated, after receiving information from the second computing device indicating that the copy of the first data entity has been updated in the second volatile memory.

24. The data processing system of claim 18, wherein the first respective identifiers and the second respective identifiers are the same.

25. A method, performed by a first computing device having a first volatile memory configured to store a plurality of data entities associated with first respective identifiers, the first computing device being different from and communicatively coupled to a second computing device having a second volatile memory configured to store copies of data entities in the plurality of data entities, the copies associated with second respective identifiers, the method comprising:

receiving an indication to perform resynchronization;

providing, to the second computing device, information comprising an identifier and a version number for each of the plurality of data entities;

receiving, from the second computing device, information identifying at least one data entity stored in the first volatile memory that is not synchronized with its respective at least one copy in the second volatile memory; and in response to receiving the information, providing to the second computing device the at least one data entity stored in the first volatile memory, wherein the first volatile memory comprises first on-heap memory, and wherein the first computing device is configured to store a first data entity of the plurality of data entities in the first on-heap memory.

26. The method of claim 25, wherein the first volatile memory is configured to store a version number for each of a plurality of data entities including a first version number for a first data entity in the plurality of data entities, and wherein the first computing device is configured to:

increment the first version number in response to updating the first data entity.

27. The method of claim 25, wherein the second volatile memory is configured to store a first copy of the first data entity, and wherein the first computing device is configured to perform:

receiving an indication to update the first data entity;

in response to the receiving the indication,
updating the first data entity in the first volatile memory, and
providing to the second computing device an indication to update a copy of the first data entity stored in the second volatile memory; and providing an indication that the first data entity has been updated, after receiving information from the second computing device indicating that the copy of the first data entity has been updated in the second volatile memory.

28. The method of claim 25, wherein the first respective identifiers and the second respective identifiers are the same.

29. At least one non-transitory computer readable storage medium storing processor-executable instructions that, when executed by a first computing device having a first volatile memory configured to store a plurality of data entities associated with first respective identifiers, cause the first computing device to perform a method, the first computing device being different from and communicatively coupled to a second computing device having a second volatile memory configured to store copies of data entities in the plurality of data entities, the copies associated with second respective identifiers, the method comprising:

receiving an indication to perform resynchronization;

providing, to the second computing device, information comprising an identifier and a version number for each of the plurality of data entities;

receiving, from the second computing device, information identifying at least one data entity stored in the first volatile memory that is not synchronized with its respective at least one copy in the second volatile memory; and in response to receiving the information, providing to the second computing device the at least one data entity stored in the first volatile memory, wherein the first volatile memory comprises first on-heap memory, and wherein the first computing device is configured to store a first data entity of the plurality of data entities in the first on-heap memory.

\* \* \* \* \*